(12) United States Patent
MacLeod et al.

(10) Patent No.: US 10,100,617 B2
(45) Date of Patent: Oct. 16, 2018

(54) EXPANDABLE SLIP SYSTEM

(71) Applicant: Petrowell Limited, Aberdeen (GB)

(72) Inventors: Iain MacLeod, Aberdeen (GB);
Andrew John Elrick, Peterhead (GB);
Stephen Reid, Aberdeen (GB)

(73) Assignee: Weatherford Technology Holdings, LLC, Houston, TX (US)

( * ) Notice: Subject to any disclaimer, the term of this patent is extended or adjusted under 35 U.S.C. 154(b) by 254 days.

(21) Appl. No.: 15/018,770

(22) Filed: Feb. 8, 2016

(65) Prior Publication Data

US 2016/0251921 A1    Sep. 1, 2016

Related U.S. Application Data

(62) Division of application No. 13/145,473, filed as application No. PCT/GB2010/050093 on Jan. 22, 2010, now Pat. No. 9,890,614.

(30) Foreign Application Priority Data

Jan. 22, 2009  (GB) .................................. 0901034.9

(51) Int. Cl.
*E21B 41/00* (2006.01)
*E21B 17/07* (2006.01)
(Continued)

(52) U.S. Cl.
CPC .............. *E21B 41/00* (2013.01); *E21B 17/07* (2013.01); *E21B 23/01* (2013.01); *E21B 23/06* (2013.01); *E21B 33/129* (2013.01)

(58) Field of Classification Search
CPC ........ F16D 1/0841; F16D 1/095; F16D 1/096; F16D 1/092; F16D 19/083; E21B 17/07;
(Continued)

(56) References Cited

U.S. PATENT DOCUMENTS 2,707,108 A    4/1955  Schottler
2,841,224 A *  7/1958  Baker ................. E21B 33/1292
                                                166/129
(Continued)

FOREIGN PATENT DOCUMENTS

CA           1317985 C      5/1993

OTHER PUBLICATIONS

International Preliminary Report on Patentability for WO Patent Application No. PCT/GB2010/050093; dated Jul. 26, 2011; pp. 1-10.

(Continued)

*Primary Examiner* — Joshua T Kennedy
(74) *Attorney, Agent, or Firm* — Blank Rome, LLP

(57) ABSTRACT

An expandable slips system for use on a mandrel having a longitudinal axis, the mandrel adapted to be run into a borehole, the expandable slips system comprising: at least one slip which in use is adapted to be moved outwardly from the longitudinal axis of the mandrel to grip against and thereby engage a downhole formation, the at least one slip comprising at least one angled member; at least one cone member for engagement with the at least one slip, the cone member comprising at least one angled member for engagement with the at least one angled member of the slip; and at least one cone member expansion device for engagement with the at least one cone member, the cone member expansion device comprising at least one angled member for engagement with another at least one angled member of the cone member.

17 Claims, 22 Drawing Sheets

(51) Int. Cl.
*E21B 23/06* (2006.01)
*E21B 33/129* (2006.01)
*E21B 23/01* (2006.01)

(58) Field of Classification Search
CPC .... E21B 23/06; E21B 33/129; E21B 33/1291; F16L 19/083; F16B 7/025; F16B 7/1463; F16B 7/149
See application file for complete search history.

(56) References Cited

U.S. PATENT DOCUMENTS

| | | | |
|---|---|---|---|
| 3,094,169 A * | 6/1963 | Conrad | E21B 33/1292 166/134 |
| 3,374,839 A * | 3/1968 | Lebourg | E21B 33/1294 166/131 |
| 3,406,758 A * | 10/1968 | Page, Jr. | E21B 23/04 166/212 |
| 4,151,876 A | 5/1979 | Briggs et al. | |
| 4,281,840 A * | 8/1981 | Harris | E21B 33/1208 277/342 |
| 4,330,143 A | 5/1982 | Reneau | |
| 4,444,527 A | 4/1984 | Fournie et al. | |
| 4,445,714 A | 5/1984 | Kisiel, III | |
| 4,600,063 A | 7/1986 | Beasley | |
| 4,630,690 A | 12/1986 | Beasley | |
| 4,660,637 A | 4/1987 | McGill et al. | |
| 4,714,111 A | 12/1987 | Brammer | |
| 5,232,249 A | 8/1993 | Kolvereid | |
| 5,332,245 A | 7/1994 | King | |
| 5,377,749 A * | 1/1995 | Barbee | E21B 23/06 166/120 |
| 5,415,441 A | 5/1995 | Kilgore et al. | |
| 5,655,603 A | 8/1997 | Schulte et al. | |
| 5,941,306 A | 8/1999 | Quinn | |
| 6,167,963 B1 * | 1/2001 | McMahan | E21B 33/1204 166/118 |
| 6,382,868 B1 | 5/2002 | Durham | |
| 7,178,589 B2 * | 2/2007 | Campbell | E21B 23/01 166/117.6 |
| 7,377,328 B2 * | 5/2008 | Dewey | E21B 23/01 166/134 |
| 7,431,096 B2 * | 10/2008 | Fay | E21B 23/01 166/208 |
| 7,448,591 B2 | 11/2008 | Ross | |
| 7,455,118 B2 | 11/2008 | Roberts et al. | |
| 7,487,832 B2 * | 2/2009 | Read, Jr. | E21B 17/06 166/123 |
| 7,837,238 B2 | 11/2010 | Krausz et al. | |
| 8,506,200 B2 | 8/2013 | Lu | |
| 8,567,510 B2 * | 10/2013 | Christie | E21B 23/00 166/122 |
| 2005/0077053 A1 | 4/2005 | Walker et al. | |
| 2007/0227745 A1 | 10/2007 | Roberts et al. | |
| 2011/0005779 A1 * | 1/2011 | Lembcke | E21B 33/1293 166/387 |

OTHER PUBLICATIONS

Patent Examination Report No. 1 in counterpart Australian Appl. 2015243057, dated May 27, 2016.
Patent Examination Report No. 1 in counterpart Australian Appl. 2015243098, dated Jun. 29, 2016.
European Examination Report in counterpart EP Appl. 10 703 333.4, dated Jul. 21, 2016.

* cited by examiner

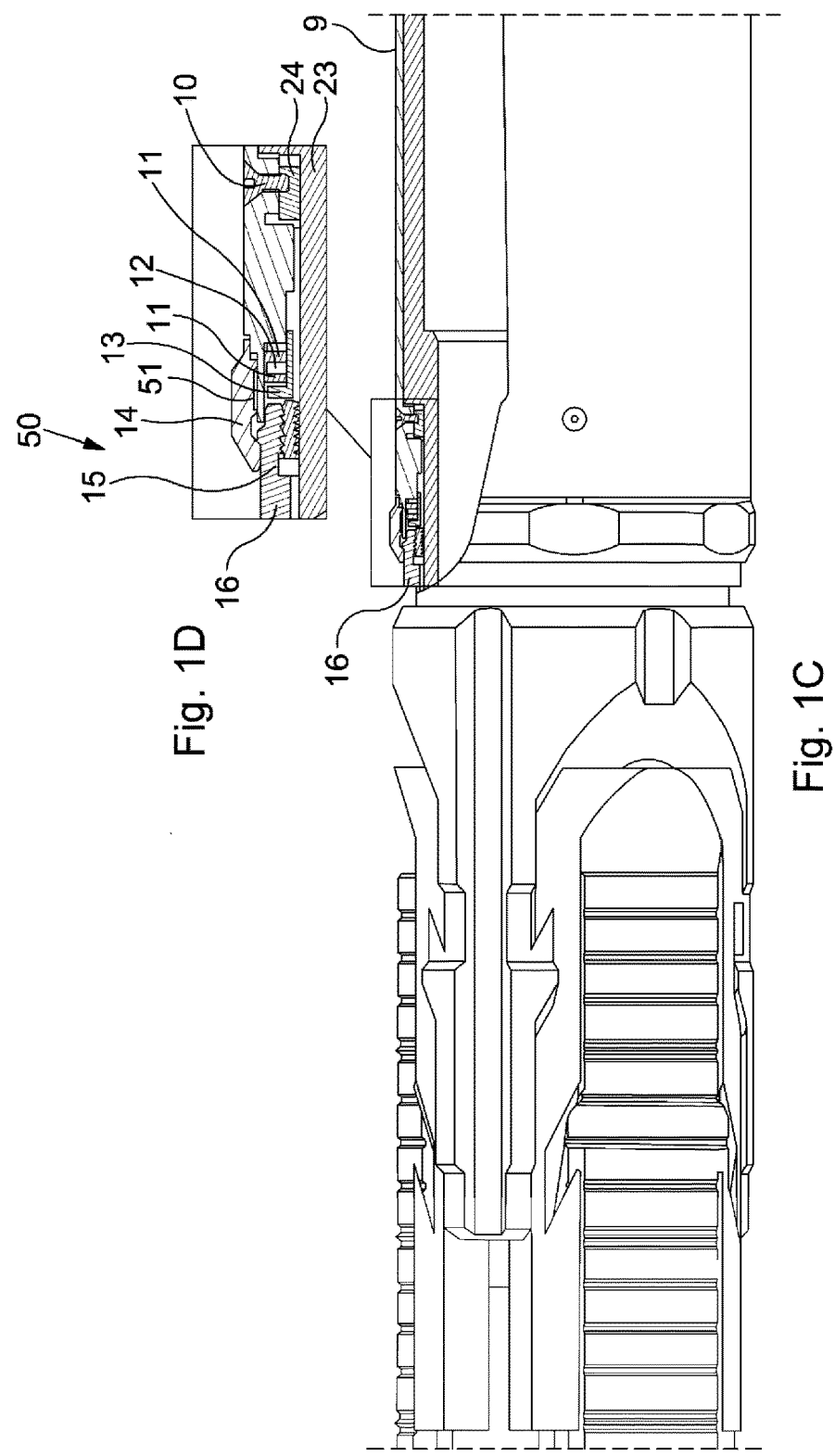

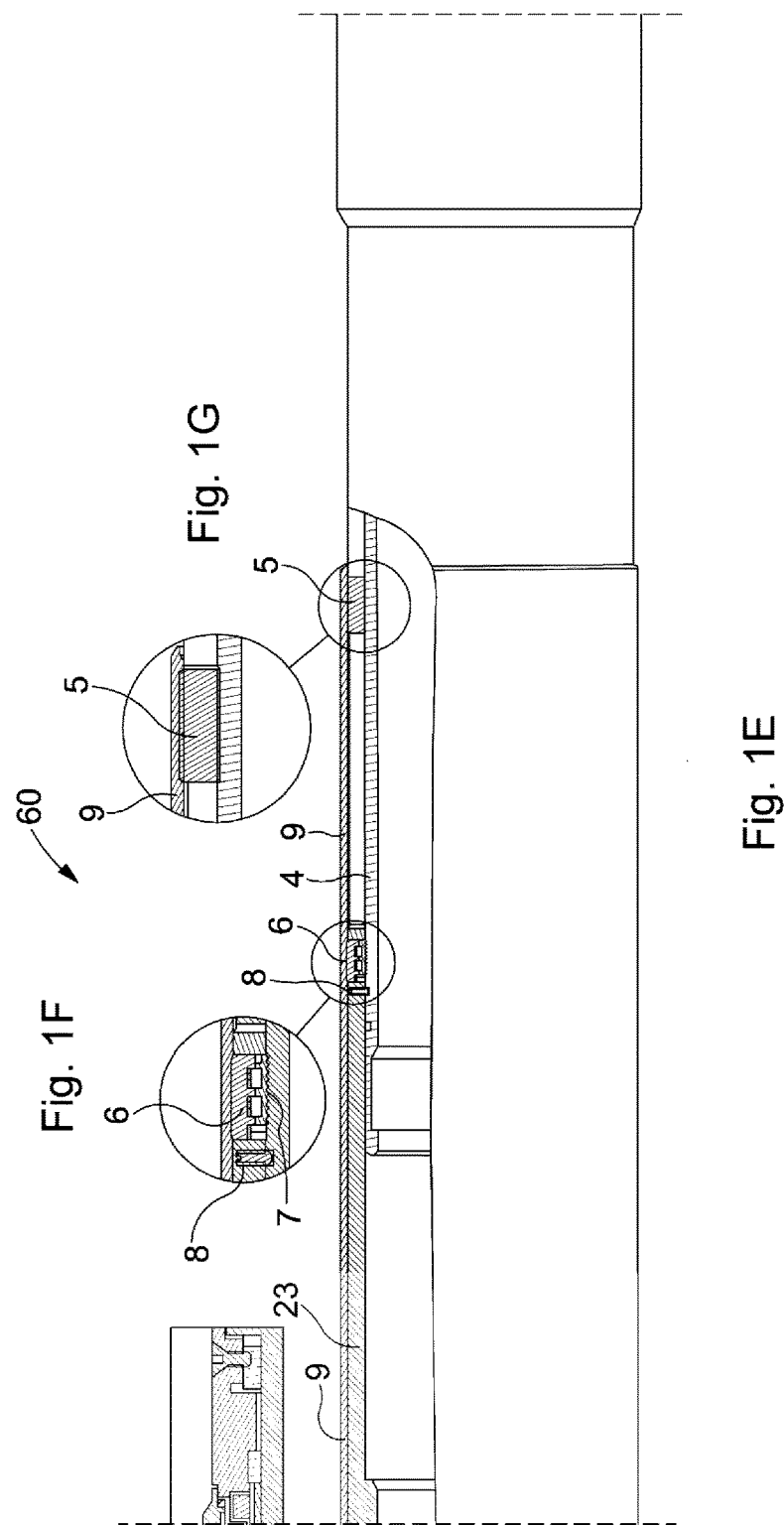

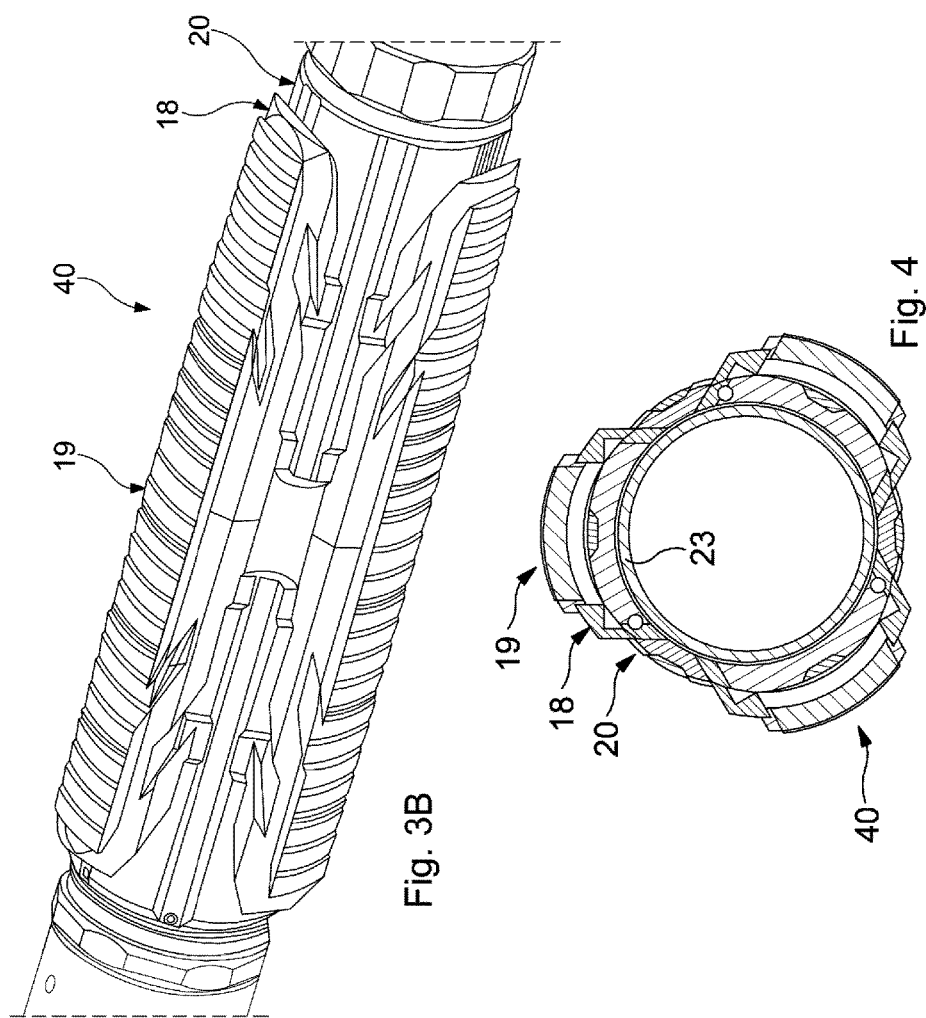

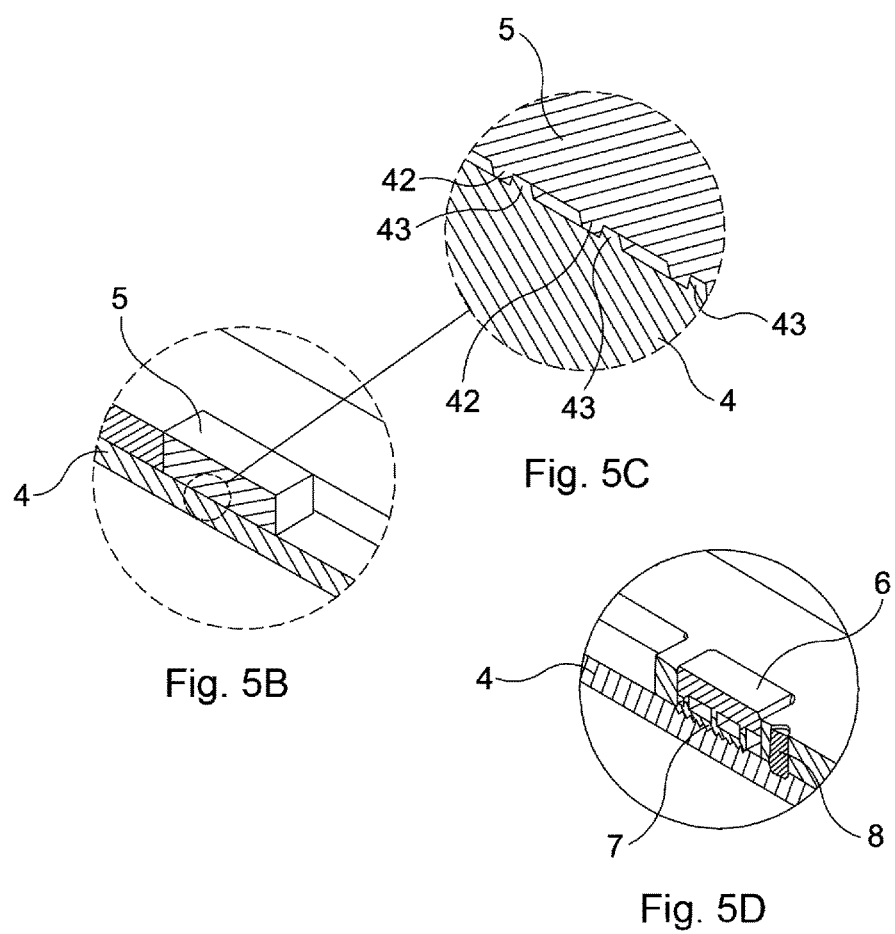

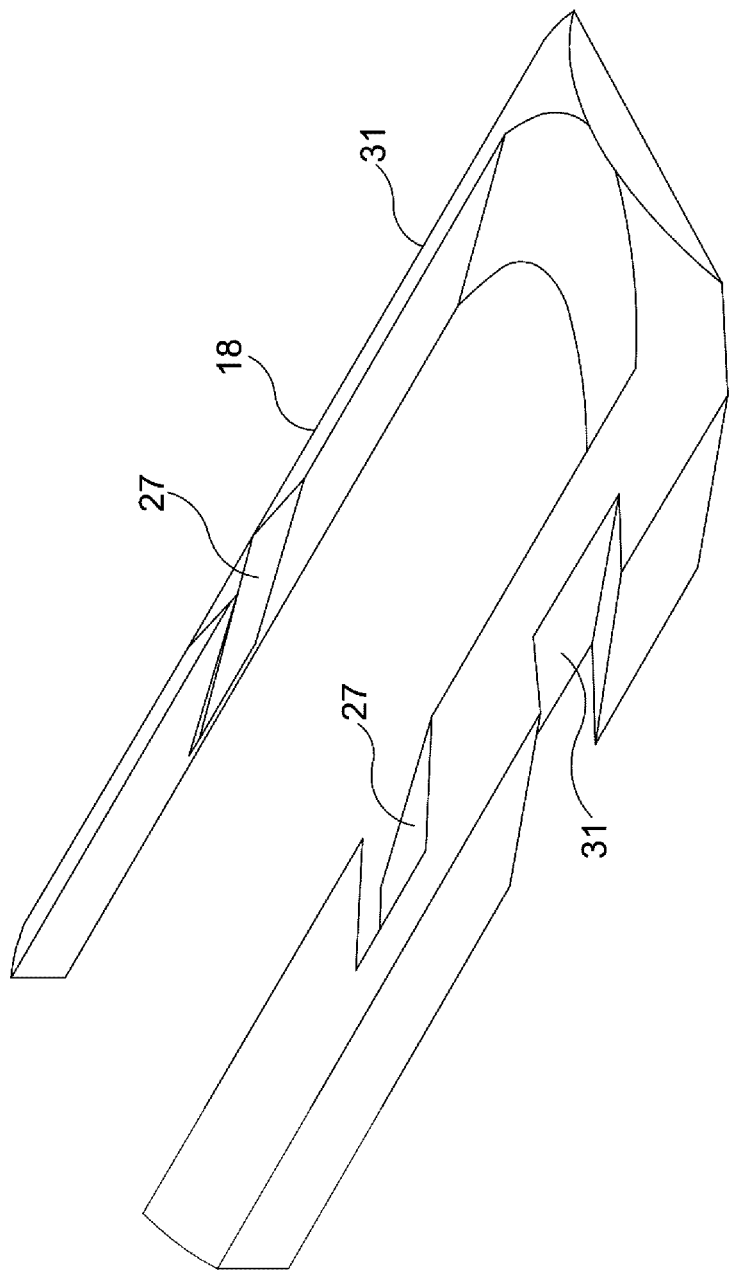

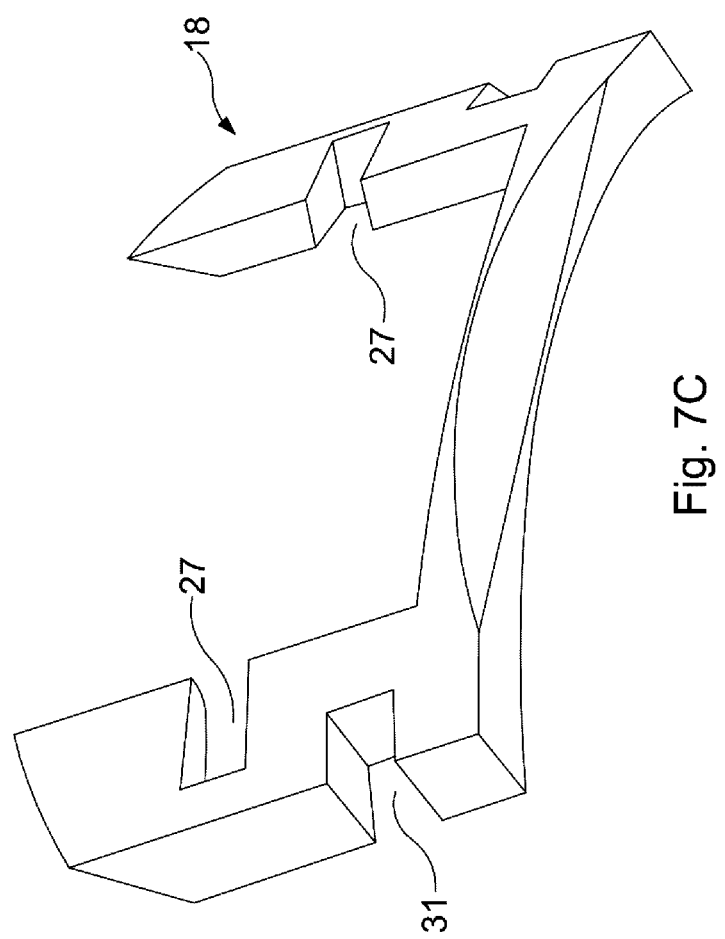

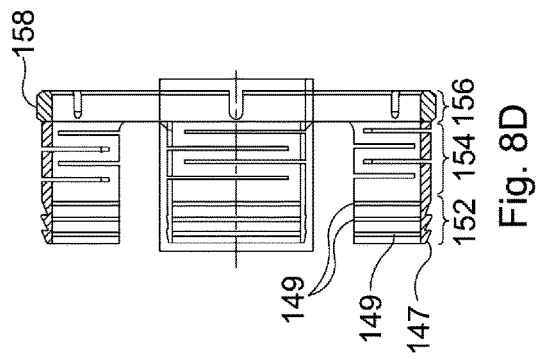
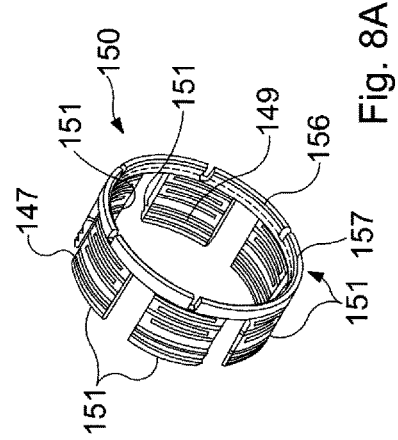
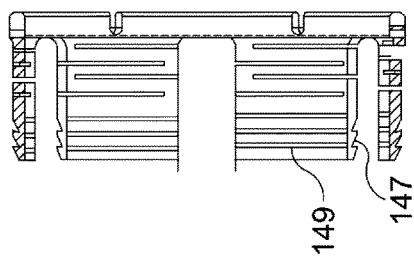
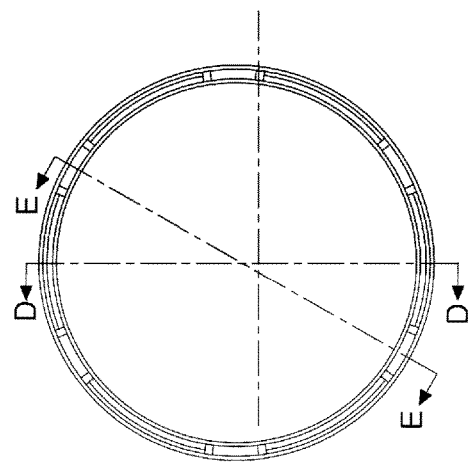
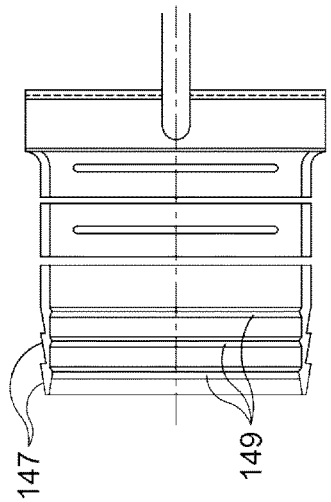

EXPANDABLE SLIP SYSTEM

CROSS-REFERENCE TO RELATED APPLICATIONS

This is a divisional of U.S. patent application Ser. No. 13/145,473, filed 4 Aug. 2011, which is incorporated herein by reference in its entirety and to which priority is claimed.

FIELD OF THE DISCLOSURE

The present invention relates to an apparatus and method, and particularly relates to downhole tools used in oil and gas wellbores.

BACKGROUND OF THE DISCLOSURE

Conventionally, many different types of tools are used when drilling for oil and gas and, conventionally, such tools are connected together into a string of tubulars and run into the wellbore. There are several different stages when creating a wellbore ready to produce oil and gas such as drilling, casing, cementing and completing the wellbore. Each stage requires a different set of tools and processes.

For example, completing the wellbore normally occurs toward the end of the process of creating an oil and gas production well. In many such wells there is a requirement for example to prevent sand being produced along with the oil or gas from the production zone and this is normally achieved by using sand screens which are placed in the production zone of the wellbore and act very much like sieves, in that they allow the oil or gas to pass through their side walls but prevent the sand from passing through their side walls by utilizing a mesh which is sufficiently sized such that its apertures are smaller than the grains of sand. It is important however to anchor the sand screens in the wellbore and this is conventionally achieved by using a mechanically set or hydraulically set slips anchor or a hanger which can be actuated to move a set of anchoring slips outwards to grip into or bite into the open hole formation and thus can be used to transfer load from the anchor and any other tools connected to the anchor such as sand screens, etc. into the formation. Conventionally, a mechanically set slip anchor comprises a set of slips that sit in a wedge shaped recess and which, when pushed axially, will be also forced radially outwardly. However, such conventionally mechanical slips suffer from the disadvantage that they are somewhat limited to the extent that they can extend radially outwardly.

SUMMARY OF THE DISCLOSURE

Accordingly, it is an object of a first aspect of the present invention to provide embodiments of a slip mechanism that provides the possibility of a greater radial expansion or a higher expansion slip system than available with conventional tools.

From another and more important aspect, it is well known in the oil and gas completion field and in many other oil and non-oil fields to use lock rings that operate on a ratchet mechanism principle to provide a one way locking mechanism such that an outer telescopic tubular and the lock ring can be moved one way along a ratchet mechanism (formed upon the outer circumference of an inner tubular telescopingly arranged within the outer tubular) upon actuation of mechanical or hydraulic operation in order to actuate e.g. a slips system or a packer but the one way lock ring ratchet mechanism prevents the outer tubular and the lock ring from moving back in the opposite direction. Similarly, the one way locking mechanism can be configured such that an inner telescoping tubular and the lock ring can be moved one way along a ratchet mechanism (formed upon the inner circumference of an outer tubular telescopingly arranged out with the inner tubular). Thus, the one way lock ring ratchet mechanism prevents e.g. deflation of the packer or prevents a slips system from moving radially inward. However, such conventional lock ring ratchet mechanisms suffer from the disadvantage that they have a reasonably high backlash distance because of the reasonably high pitch of the lock ring ratchet mechanism profile. In other words, the lock ring has to be moved the relatively long distance of the length of each tooth until each tooth clears the next respective tooth of the ratchet upon which the lock ring sits around before the lock ring is prevented from moving back. Therefore, if the lock ring does not clear the tooth before the pressure of the mechanical actuation mechanism is removed then the lock ring will relax back to the last point it cleared. There are also a number of failure modes with conventional lock rings including the ratchet mechanism teeth shearing or the supporting tubular failing due to burst or collapse. Conventional ways to prevent such burst or collapse can include increasing the length of the lock ring because doing so spreads the load but sometimes this cannot be achieved due to space limitations. Furthermore, conventional lock rings have back lash in two areas:

1) on the static ratchet mechanism profile there is axial slop because the lock ring must be allowed to expand; and 2) on the moveable ratchet mechanism profile because it has to jump a thread form as it moves along axially, as discussed above.

Typically, a conventional body lock ring will comprise a 16 Thread Per Inch (TPI) moveable ratchet mechanism profile and an 8 TPI static thread profile. It is also known to try and reduce back lash by increasing the pitch on the moveable ratchet mechanism profile but the lock ring then becomes difficult to manufacture and also the lock ring then becomes very prone to failure due to any debris getting between it and the static tubular member and thus becomes less reliable. It should also be noted that should the lock ring fail then the user will experience catastrophic failure of the tool. Conventional lock rings are typically formed of 4140 (18-22 Rockwell C hardness) steel which is typically the same as the mandrel or tubular about which the lock ring is placed.

Accordingly, it is an object of another aspect of the present invention to provide a reduced backlash lock ring ratchet mechanism that can be used on a wide variety of tools whether downhole or otherwise.

From a yet further aspect, there is a problem with conventional mechanical actuation mechanisms for e.g. slips or packers in that they can be unintentionally/accidentally set whilst running in the hole.

Accordingly, it is an object of another aspect of the present invention to overcome such problems with conventional mechanical actuation mechanisms for e.g. any tools that require to be actuated downhole by mechanical means by providing a setting section that is locked until actuation is desired and the setting section is positively actuated.

According to a first aspect of the present invention there is provided a lock ring for use as a one way movement restrictor between two telescopingly arranged tubulars to permit movement in one direction and prevent movement in the other direction of one tubular relative to the other tubular; the lock ring comprising:

a profile having one or more formations formed on the outer circumference for engagement with a suitable formation profile formed on the inner circumference of the outer telescopic tubular; and one or more teeth formed on its inner circumference, the teeth being adapted to dig into the outer surface of the inner telescopic member;

such that the profile having one or more formations on the outer circumference and/or the said one or more teeth permits the lock ring to be pushed along the outer surface of the inner telescopic tubular when pushed by the outer telescopic tubular in one direction; and is further adapted to dig the teeth into the outer surface of the inner telescopic tubular when the push in said one direction is removed or when it is pushed by the outer telescopic tubular in the other direction in order to prevent the lock ring from moving in the other direction relative to the inner telescopic tubular.

Preferably, at least the one or more teeth of the lock ring are formed from a harder material than the material of the inner telescopic member and typically, the at least the one or more teeth of the lock ring are formed from a material that is in the region of 20 Rockwell C greater than the hardness of the material of the inner telescopic tubular. Alternatively or in addition, the material of the lock ring may be surface treated to provide the teeth with at least an outer surface formed from a harder material than the material of the inner telescopic member.

Typically, the lock ring is hardness treated during manufacture.

Typically, the outer surface of the inner telescopic tubular is relatively smooth and is preferably provided without a ratchet mechanism that the teeth would otherwise have to climb and jump when moving in the said one direction.

Preferably, the profile having one or more formations formed on the outer circumference of the lock ring comprises a thread profile and the suitable formation profile formed on the inner circumference of the outer telescopic tubular also comprises a suitable thread profile.

Preferably, the thread profile of the outer circumference of the lock ring comprises a flank angle in the region of 20 degrees and a cut back rear face angle in the region of 80 degrees radially outwardly in the other direction from the longitudinal axis of the lock ring.

Preferably, the lock ring further comprises a spring member adapted to bias the lock ring in the said one direction. The spring member preferably acts to push the lock ring in the said one direction and is preferably pre-loaded during installation to a pre-determined amount of loading.

Preferably, the pre-loading of the spring member ensures that there is a constant spring load exerted onto the flank angle of the pitch profile on the outer circumference of the lock ring and the flank angle on the inner circumference of the outer telescopic tubular. Preferably, the thread profile of the outer circumference of the lock ring comprises a flank angle in the region of 20 degrees and a cut back rear face angle in the region of 80 degrees radially outwardly in the other direction from the longitudinal axis of the lock ring.

Typically, the spring member acts between an end of the lock ring that faces in the direction of the said other direction and a portion of the outer telescopic tubular.

In one embodiment the lock ring may be a split ring or "C" shaped lock ring and in such an embodiment, the lock ring is formed separately from the spring member.

In a preferred embodiment, the lock ring is formed integrally with the spring member and in such an embodiment, the lock ring is preferably castellated and/or is provided in circumferentially equi-spaced tongues, each having a part circular extent. The lock ring may further comprise an annular ring at one end comprising a screw thread formation thereon to provide for fixing of that end to the outer telescopic tubular and in such an embodiment, the spring member is typically located in between the lock ring section and the annular ring, with the lock ring, the spring member and the annular ring all being integrally formed in a one piece unit.

Preferably, the inner diameter of the lock ring teeth is preferably slightly less than the outer diameter of the inner telescopic tubular.

The spring member may be a wave spring, a coil spring, one or more "S" shaped springs, or any other suitable spring.

According to the present invention there is also provided a method of actuating a one way locking system comprising a lock ring in accordance with the first aspect of the present invention, the method comprising preloading the spring member to a pre-determined amount and applying load to the outer telescopic member relative to the inner telescopic member to move the lock ring in said one direction and relaxing the load such that the outer telescopic tubular is prevented from moving in the other direction relative to the inner telescopic member.

According to a second aspect of the present invention there is provided a lock ring for use as a one way movement restrictor between two telescopingly arranged tubulars to permit movement in one direction and prevent movement in the other direction of one tubular relative to the other tubular; the lock ring comprising:

a profile having one or more formations formed on the inner circumference for engagement with a suitable formation profile formed on the outer circumference of the inner telescopic tubular; and one or more teeth formed on its outer circumference, the teeth being adapted to dig into the inner surface of the outer telescopic member;

such that the profile having one or more formations on the inner circumference and/or the said one or more teeth permits the lock ring to be pushed along the inner surface of the outer telescopic tubular when pushed by the inner telescopic tubular in one direction; and is further adapted to dig the teeth into the inner surface of the outer telescopic tubular when the push in said one direction is removed or when it is pushed by the inner telescopic tubular in the other direction in order to prevent the lock ring from moving in the other direction relative to the outer telescopic tubular.

Preferably, at least the one or more teeth of the lock ring are formed from a harder material than the material of the outer telescopic member and typically, the at least one or more teeth of the lock ring are formed from a material that is in the region of 20 Rockwell C greater than the hardness of the material of the outer telescopic tubular. Alternatively or in addition, the material of the lock ring may be surface treated to provide the teeth with at least an outer surface formed from a harder material than the material of the outer telescopic member.

Typically, the lock ring is hardness treated during manufacture.

Typically, the inner surface of the outer telescopic tubular is relatively smooth and is preferably provided without a ratchet mechanism that the teeth would otherwise have to climb and jump when moving in the said one direction.

Preferably, the profile having one or more formations formed on the inner circumference of the lock ring comprises a thread profile and the suitable formation profile formed on the outer circumference of the inner telescopic tubular also comprises a suitable thread profile.

Preferably, the thread profile of the inner circumference of the lock ring comprises a flank angle in the region of 20 degrees and a cut back rear face angle in the region of 80 degrees radially outwardly in the other direction from the longitudinal axis of the lock ring.

Preferably, the lock ring further comprises a spring member adapted to bias the lock ring in the said one direction. The spring member preferably acts to push the lock ring in the said one direction and is preferably preloaded during installation to a pre-determined amount of loading.

Preferably, the pre-loading of the spring member ensures that there is a constant spring load exerted onto the flank angle of the pitch profile on the inner circumference of the lock ring and the flank angle on the outer circumference of the inner telescopic tubular. Preferably, the thread profile of the inner circumference of the lock ring comprises a flank angle in the region of 20 degrees and a cut back rear face angle in the region of 80 degrees radially outwardly in the other direction from the longitudinal axis of the lock ring.

Typically, the spring member acts between an end of the lock ring that faces in the direction of the said other direction and a portion of the outer telescopic tubular.

In one embodiment the lock ring may be a split ring or "C" shaped lock ring and in such an embodiment, the lock ring is formed separately from the spring member.

In a preferred embodiment, the lock ring is formed integrally with the spring member and in such an embodiment, the lock ring is preferably castellated and/or is provided in circumferentially equi-spaced tongues, each having a part circular extent. The lock ring may further comprise an annular ring at one end comprising a screw thread formation thereon to provide for fixing of that end to the inner telescopic tubular and in such an embodiment, the spring member is typically located in between the lock ring section and the annular ring, with the lock ring, the spring member and the annular ring all being integrally formed in a one piece unit.

Preferably, the outer diameter of the lock ring teeth is slightly greater than the inner diameter of the outer telescopic tubular.

The spring member may be a wave spring, a coil spring, one or more "S" shaped springs, or any other suitable spring.

According to the present invention there is also provided a method of actuating a one way locking system comprising a lock ring in accordance with the second aspect of the present invention, the method comprising pre-loading the spring member to a pre-determined amount and applying load to the inner telescopic member relative to the outer telescopic member to move the lock ring in said one direction and relaxing the load such that the inner telescopic tubular is prevented from moving in the other direction relative to the outer telescopic member.

According to a third aspect of the present invention there is provided an expandable slips system for use on a mandrel having a longitudinal axis, the mandrel adapted to be run into a borehole, the expandable slips system comprising:

at least one slip which in use is adapted to be moved outwardly from the longitudinal axis of the mandrel to grip against and thereby engage a downhole formation, the at least one slip comprising at least one angled member;

at least one cone member for engagement with the at least one slip, the cone member comprising at least one angled member for engagement with the at least one angled member of the slip; and at least one cone member expansion device for engagement with the at least one cone member, the cone member expansion device comprising at least one angled member for engagement with another at least one angled member of the cone member.

According to the third aspect of the present invention there is provided a method of actuating an expandable slips system in accordance with the apparatus of the first aspect of the present invention, comprising:

moving the cone member expansion device in a direction parallel with the longitudinal axis of the mandrel such that the cone member is moved radially outwardly and the slip is moved radially outwardly from a running in lying flat configuration to an extended in use configuration.

Typically, the slip system is arranged such that movement of the at least one cone member expansion device in a direction parallel to the longitudinal axis of the mandrel causes the cone member to move:

in a direction parallel to the longitudinal axis of the mandrel; and in a radially outwards direction perpendicular to the longitudinal axis of the mandrel.

Typically, the slip system is further arranged such that the said movement of the at least one cone member causes the slip to move in a radially outwards direction perpendicular to the longitudinal axis of the mandrel.

Preferably, there are two cone member expansion devices spaced apart along the longitudinal axis of the mandrel, where one cone member expansion device may be fixed to the mandrel and the other cone member expansion device may be moveable along the longitudinal axis of the mandrel with respect to the said one cone member expansion device such that the moveable cone member expansion device can be selectively moved toward and away from the said one fixed cone member expansion device.

Preferably, there are two cone members spaced apart along the longitudinal axis of the mandrel, where one cone member may be engaged with the fixed cone member expansion device and the other cone member may be engaged with the moveable cone member expansion device such that the said one cone member can be selectively moved toward and away from the said other cone member when the moveable cone member expansion device is selectively moved toward and away from the said one fixed cone member expansion device to respectively move the slip radially outwardly and inwardly with respect to the mandrel.

Typically, the pair of cone members are telescopingly coupled to one another such that they are prevented from relative movement with respect to one another other than longitudinal movement.

Typically, longitudinal movement of the moveable cone member expansion device toward the said one fixed cone member expansion device causes longitudinal movement of one cone member toward the other cone member and also radially outwards movement of both cone members which in turn causes radially outwards movement of the slip such that the slip moves from a running in lying flat configuration to an extended in use configuration.

Furthermore, longitudinal movement of the moveable cone member expansion device away from the said one fixed cone member expansion device causes longitudinal movement of one cone member away from the other cone member and also radially inwards movement of both cone members which in turn causes radially inwards movement of the slip such that the slip returns to the running in lying flat configuration from the radially extended in use configuration.

Typically, the expandable slips system comprises one slip.

One or more expandable slips systems are preferably provided on one mandrel and in a preferred embodiment, three expandable slips systems are provided on one mandrel, where the three expandable slips systems are preferably provided equi-spaced 120 degrees around the circumference of the mandrel.

Preferably, the or each angled member of the slip comprises a surface provided at an angle between the longitudinal and the perpendicular with respect to the mandrel and preferably, the or each angled member of the respective cone member also comprises a similarly angled surface that engages with and co-operates with the angled surface of the slip.

Preferably, the or each angled member of the or each cone member expansion device comprises a surface provided at an angle between the longitudinal and the perpendicular with respect to the mandrel and preferably, the or each another angled member of the or each cone member also comprises a similarly angled surface that engages with and co-operates with the angled surface of the cone member expansion device.

Typically, the or each angled member/angled surface comprises either an angled key or an angled slot within which the key moveably resides and is retained. Preferably, the angled surface of the slip comprises one of a key or a slot and the similarly angled surface of the respective cone member comprises the other of the key or the slot, wherein the angled surface angles from radially innermost to radially outermost away from the longitudinal center of the slip. Preferably, the angled surface of the cone member expansion device comprises one of a key or a slot and the similarly angled surface of the respective cone member comprises the other of the key or the slot, wherein the angled surface angles from radially innermost to radially outermost away from the longitudinal center of the respective cone member.

Typically, the downhole formation can comprise a natural formation such as the sidewall of a section of open hole borehole or a manmade formation such as a downhole cemented section or a section of installed downhole tubular such as casing or liner.

Typically, the mandrel is adapted to be included in a string of downhole tubulars and preferably has suitable connections such as screw threaded connections to enable such inclusion.

According to a fourth aspect of the present invention there is provided an interlock and setting section for a downhole tool system, the interlock and setting section comprising:

a shifting profile located within a throughbore of the downhole tool system, wherein the shifting profile is capable of being coupled to by a shifting tool in the throughbore of the downhole tool system, in order to move the shifting profile with respect to the downhole tool system;

a load connector member coupled to the shifting profile and further coupled to a load setting member arranged to deliver a load to a tool as required;

wherein there is further provided a selective locking mechanism to selectively lock at least the load setting member to at least one of the downhole tool system and the shifting profile.

Preferably, the downhole tool system comprises a static mandrel against which a load is to be generated, wherein the static mandrel may be rigidly connected back to the surface of the downhole well.

Typically, the selective locking mechanism may be unlocked by movement of the shifting profile with respect to the static mandrel such that the lock acting between the load setting member and the at least one of the downhole tool system and the shifting profile is removed.

Typically, the locking mechanism selectively locks the load setting member to the static mandrel.

Preferably, the selective locking mechanism comprises a two lock members located in a recess in the static mandrel and which, in a locking configuration, are arranged such that one of the lock members is restrained from longitudinal movement with respect to the static mandrel and wherein the lock members radially support one another to permit load to be transferred from the load setting member to the static member and preferably to the shifting profile.

Preferably, the other of the lock members can be moved longitudinally with respect to the static mandrel by a predetermined length, when in the locking configuration, such that the radial support between the two lock members is removed and the locking mechanism is unlocked. Preferably, the locking members comprise one or more radially projecting and cooperating formations in the locking configuration which are adapted to no longer co-operate when the said other locking member is moved relative to the said one locking member.

Typically, at least one of the couplings between the load connecting member and i) the shifting profile and ii) the load setting member allows the shifting tool to move by a slightly greater distance than the said predetermined length before the coupling therebetween is capable of transferring load from the shifting profile to the load setting member.

Preferably, the shifting profile is initially secured to the static mandrel by disruptable device to prevent any unwanted movement therebetween prior to the selective unlocking occurring and more preferably, the disruptable device comprises a shear screw or shear pin or the like.

There is also provided a method of operating an interlock and setting section in accordance with the fourth aspect of the present invention from an initial locking configuration to an unlocked and load setting configuration, the method comprising running a shifting tool into the throughbore of the downhole tool system;

engaging the shifting tool with the shifting profile;

pulling or pushing the shifting tool to destroy or otherwise disable the disruptable device;

further pushing or pulling the shifting tool to move the shifting profile the pre-determined length such that the radial support between the two lock members is removed and the locking mechanism is unlocked; and further pushing or pulling the shifting tool to move the shifting profile thereby transferring load into the setting sleeve with respect to the static mandrel.

Typically, the load setting member is coupled to a tool that requires a load to be applied to it to actuate said tool.

Preferably, the load setting member is located on the outside of the downhole tool system.

BRIEF DESCRIPTION OF THE DRAWINGS

Embodiments of the present invention will now be described by way of example only, with reference to the accompanying drawings, in which:

FIG. 1C is a part cross-sectional side view of a third portion of the mechanical sets slips anchor of FIG. 1A and which in use is immediately below the portion shown in FIG. 1B and immediately above the portion shown in FIG. 1E;

FIG. 1DA is an even more close up and even more detailed cross-sectional view of the lock ring shown in FIG. 1D;

FIG. 1DB is a relatively close up and detailed cross-sectional view of an alternative and preferred embodiment of a reduced back lash lock ring in accordance with the third aspect of the present invention which can be used instead of the lock ring shown in FIG. 1DA;

FIG. 1E is a part cross-sectional side view of a fourth portion of the mechanical sets slips anchor of FIG. 1A and which in use is immediately below the portion shown in FIG. 1C and immediately above the portion shown in FIG. 1H;

FIG. 1F is a close up and more detailed cross-sectional side view of a part of the fourth portion of the mechanical set slips anchor of FIG. 1E and shows an interlock which forms a part of the interlock mechanism embodiment in accordance with the second aspect of the present invention;

FIG. 1G is a closer up and more detailed cross-sectional side view of a setting key which forms a part of the interlock mechanism embodiment in accordance with the second aspect of the present invention;

FIG. 3B is a more detailed view of the actuated slips of FIG. 3A;

FIG. 4 is a cross-sectional end view of the slip section taken through section 1-1 on FIG. 2B;

FIG. 5B is a more detailed view of the setting keys of FIG. 5A;

FIG. 5C is a more detailed view of the gap between the teeth of the setting keys of FIG. 5B;

FIG. 5D is a more detailed view of the interlock keys of FIG. 5A;

FIG. 7B is a perspective view of a cone of the slips mechanism of FIG. 7A;

FIG. 7C is another perspective view taken from a different angle of the cone of FIG. 7B;

FIG. 8A is a perspective side view of the preferred reduced backlash lock ring of FIG. 1DB;

FIG. 8B is an end view of the preferred reduced backlash lock ring of FIG. 8A;

FIG. 8C is a cross-sectional side view across section D-D of FIG. 8B of the preferred embodiment of reduced backlash lock ring;

FIG. 8D is a cross-sectional side view across section E-E of FIG. 8B of the preferred embodiment of reduced backlash lock ring; and FIG. 8E is a detailed view of the section highlighted G of one tongue of the preferred reduced backlash lock ring of FIG. 8D.

DETAILED DESCRIPTION OF THE DISCLOSURE

Figure 1A:
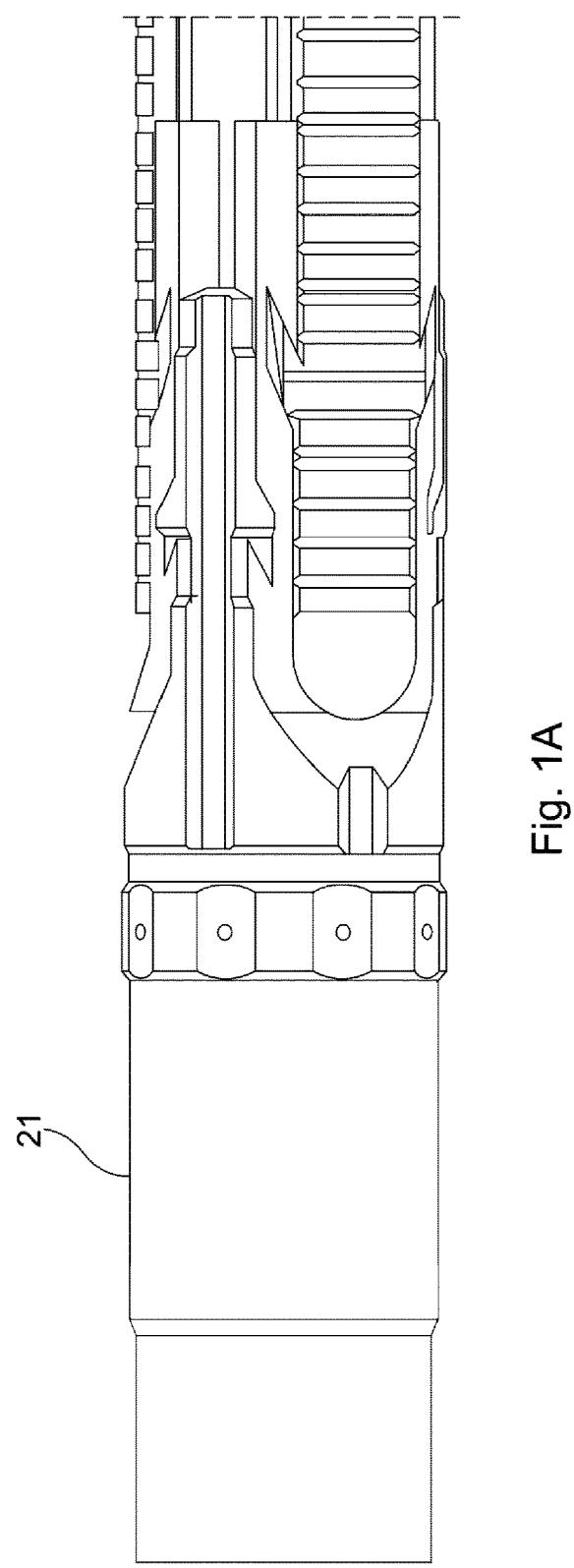
FIG. 1A is a part cross-sectional side view of the first of five portions of a mechanical set slips anchor in accordance with the first, second and third aspects of the present invention and is shown in a running-in hole or prior-to-actuation configuration, where the portion shown in FIG. 1A is the upper most in use end of the mechanical set slips anchor.

The mechanical set slips anchor 100 shown in the Figures can be regarded as having three distinct sections, these being:

a) slips section 40 (shown mainly in FIG. 1B in the unset or running in configuration and in FIG. 2B in the set or post-actuation configuration) in accordance with the first aspect of the present invention;

b) locking section 50 (which can be best seen in FIG. 1C in the unset or running in configuration and in FIG. 2C in the set or post-actuation configuration) in accordance with the second aspect of the present invention; and c) setting section 60 (which can be best seen in FIG. 1E in the running in or pre-actuation configuration and FIG. 2D in the post-actuation or set configuration) in accordance with the third aspect of the present invention.

However, it should be clearly noted that the slips section 40 could be used with other locking sections 50 or with other setting sections 60; for instance, the slips section 40 could be hydraulically set rather than mechanically set and in such a situation would the tool would be provided with a hydraulical actuation mechanism instead of the mechanical setting section 60. Furthermore, it should be noted that the locking section 50 and/or setting section 60 could be used in different applications and tools such as with e.g. packer tools used to create a pressure barrier in the annulus in a wellbore, etc.

The three main sections of the tool will now be described in turn.

A. Slips Section 40

Figure 1B:
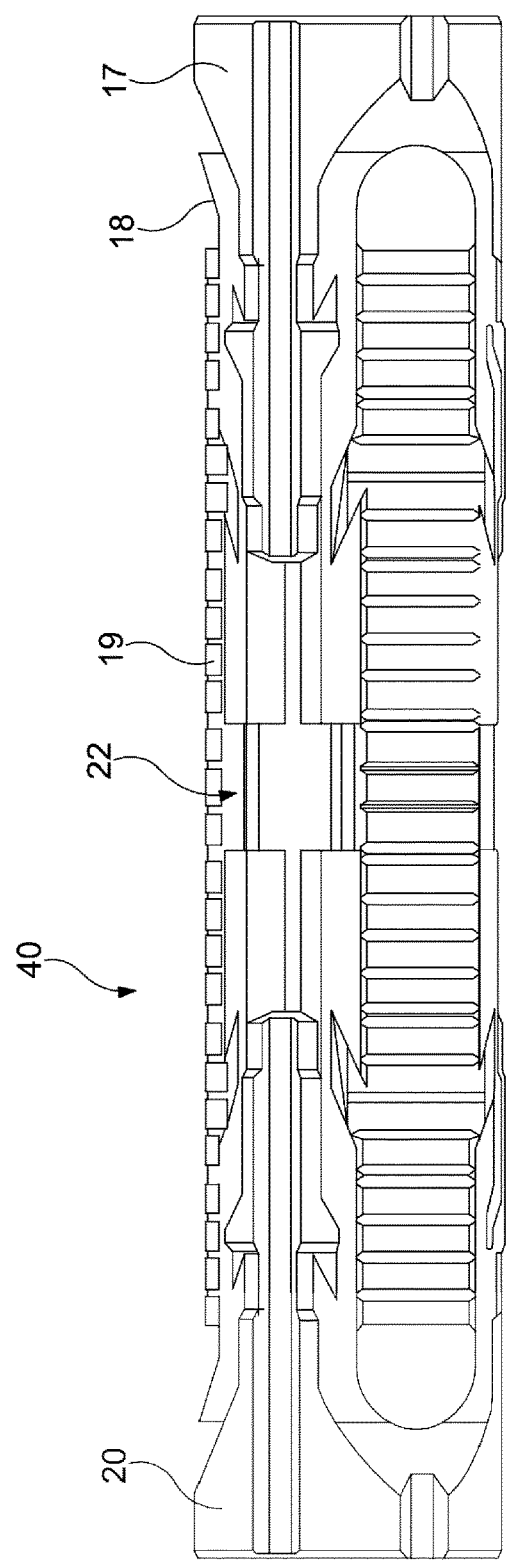
FIG. 1B is a part cross-sectional side view of a second portion of the mechanical set slips anchor of FIG. 1A, where the portion shown in FIG. 1B in use is immediately below the portion shown in FIG. 1A and immediately above the portion shown in FIG. 1C.
Figure 2A:
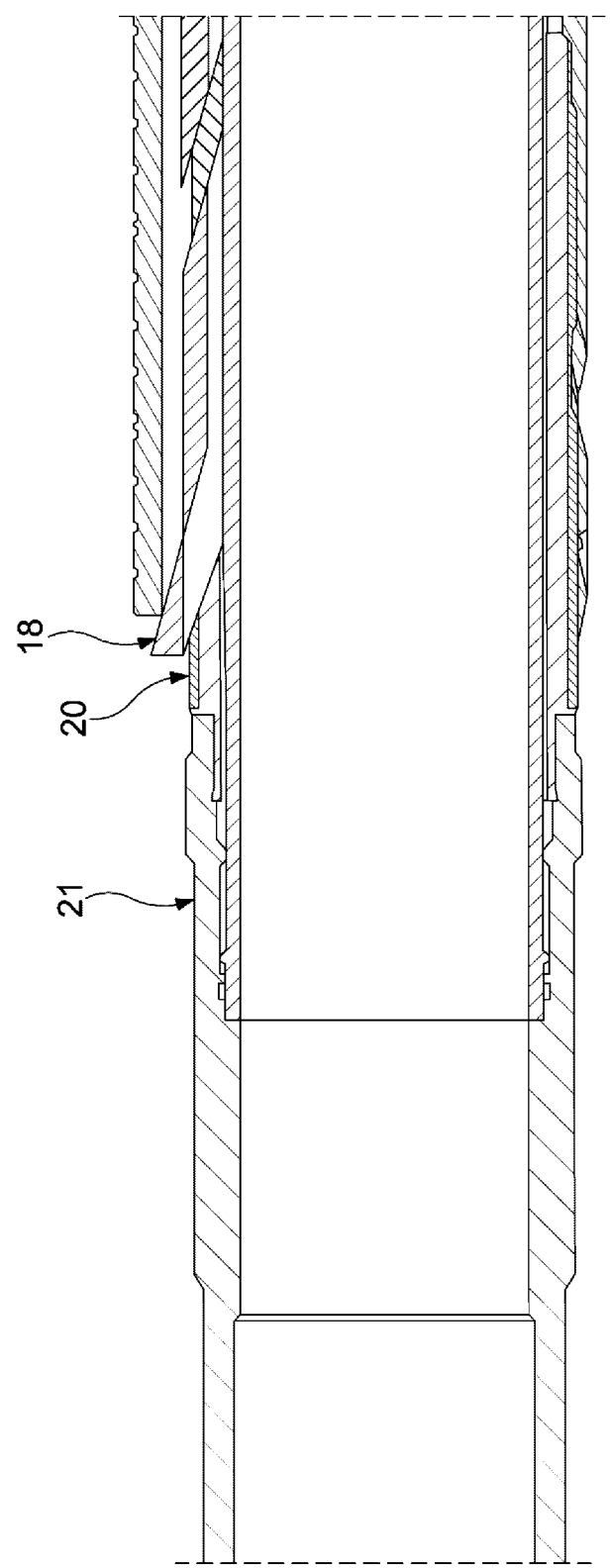
FIG. 2A is a cross-sectional side view of the mechanical set slips anchor of FIGS. 1A to 1H but shown in a post actuation or set configuration where the portion shown in FIG. 2A is the upper most in use end of the mechanical set slips anchor.
Figure 2B:
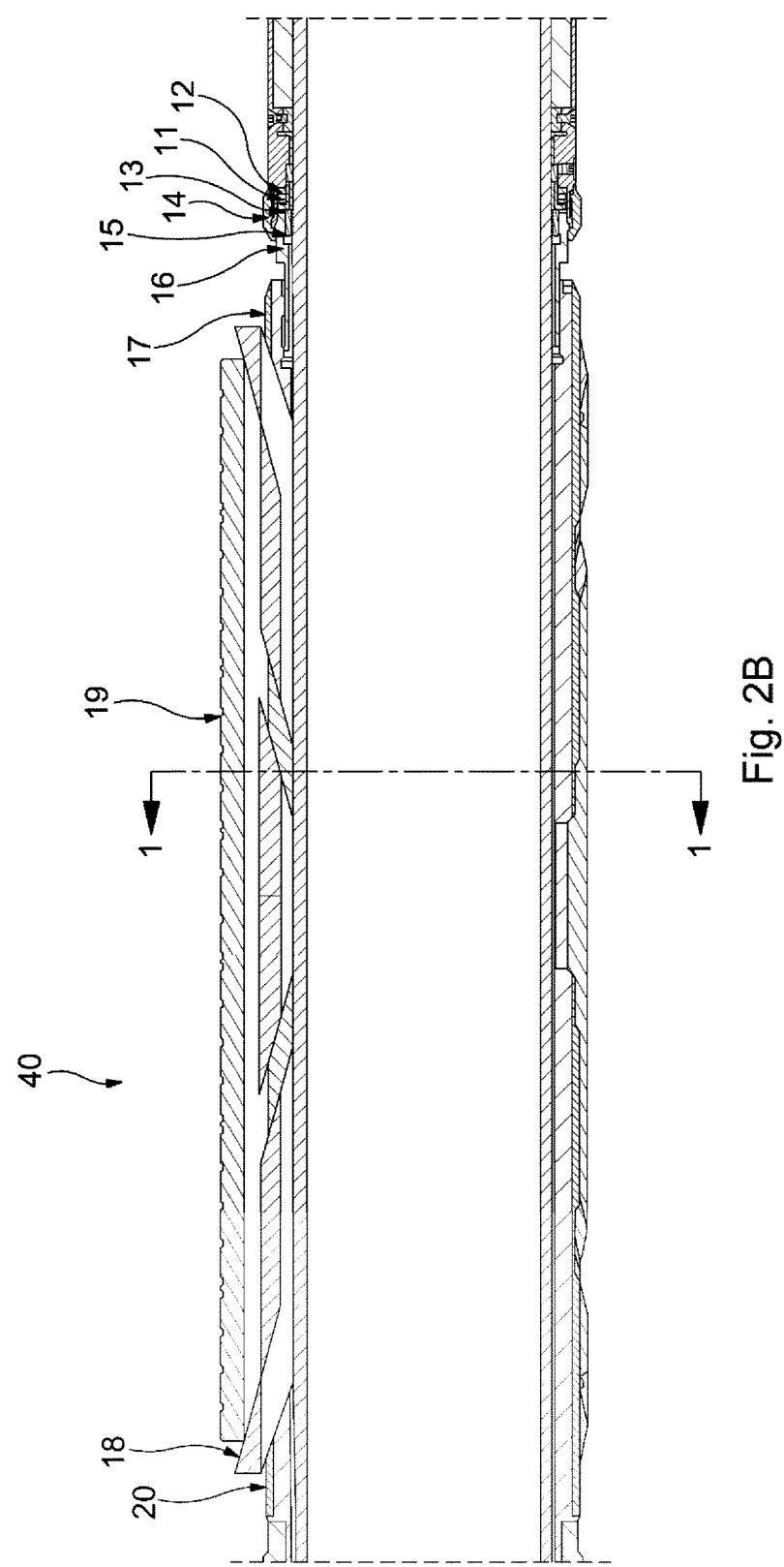
FIG. 2B is a cross-sectional side view of a second portion of the mechanical set slips anchor of FIG. 2A, where the portion shown in FIG. 2B in use is located immediately below the portion shown in FIG. 2A and immediately above the portion shown in FIG. 2C, and more particularly shows the slips having been actuated radially outwardly.

Slips section 40 comprises a top sub 21 which has a suitable connection such as a pin or box screw threaded connection provided at its very upper most end (left hand end as shown in FIGS. 1A and 2A) for connection to a suitable connection provided at the lower most end of a downhole string into which the mechanical set slips anchor 100 is to be included. The lower end of the top sub 21 is securely screw threaded to the upper end of a cone mandrel 23. The cone mandrel 23 is provided with an upper cone expander 20 which is securely screw threaded at the upper end of the cone mandrel 23 and this can be best seen in FIG. 2A. Thus, in normal operation, the upper cone expander 20 is securely fixed to the cone mandrel 23. A lower cone expander 17 is located about the mid to lower half of the cone mandrel 23 and a number of cones 18 and slips 19 are located between the upper cone expander 20 and lower cone expander 17 and, in general, movement of the lower cone expander 17 toward the upper cone expander 20 in a direction along the longitudinal axis of the cone mandrel 23 results in radially outward movement of the cones 18 and subsequently the slips 19.

Operation and expansion of the slips 19 will now be described in more detail.

Figure 3A:
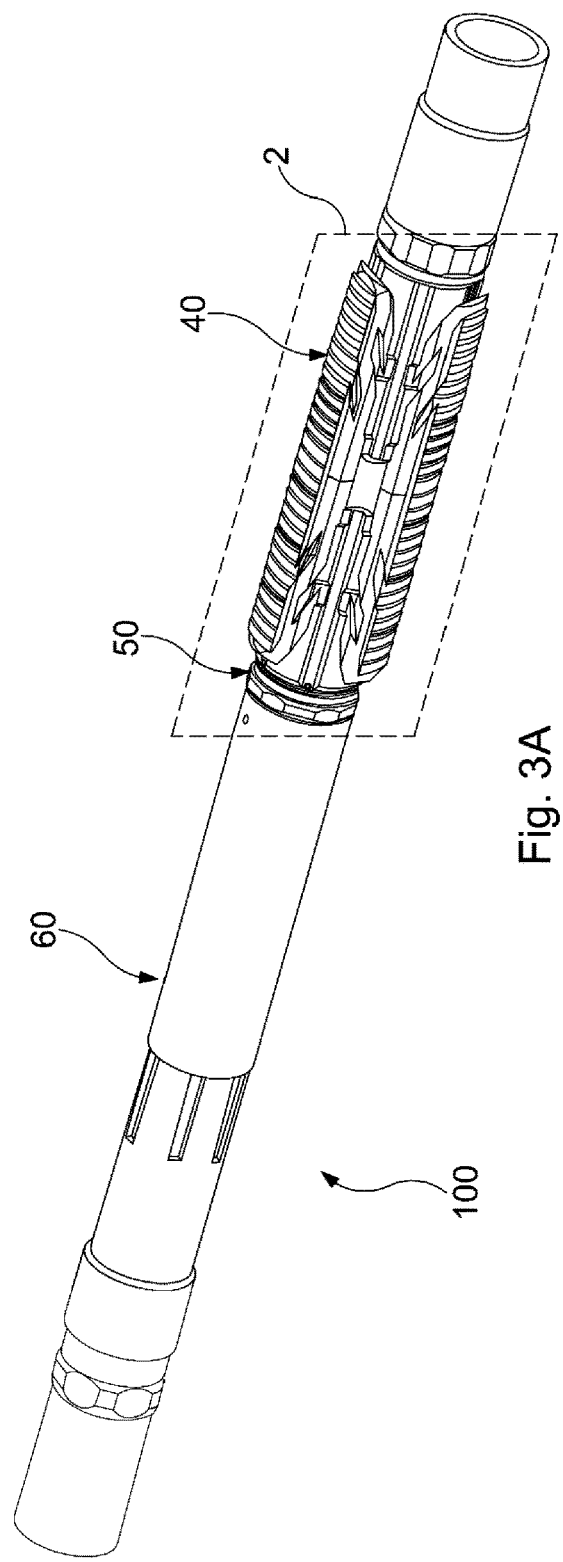
FIG. 3A is a perspective side view (with a portion cut away from the slip section for clarity) of the mechanical set slips anchor of FIGS. 2A to 2E in the post-actuation or set configuration.
Figure 7A:
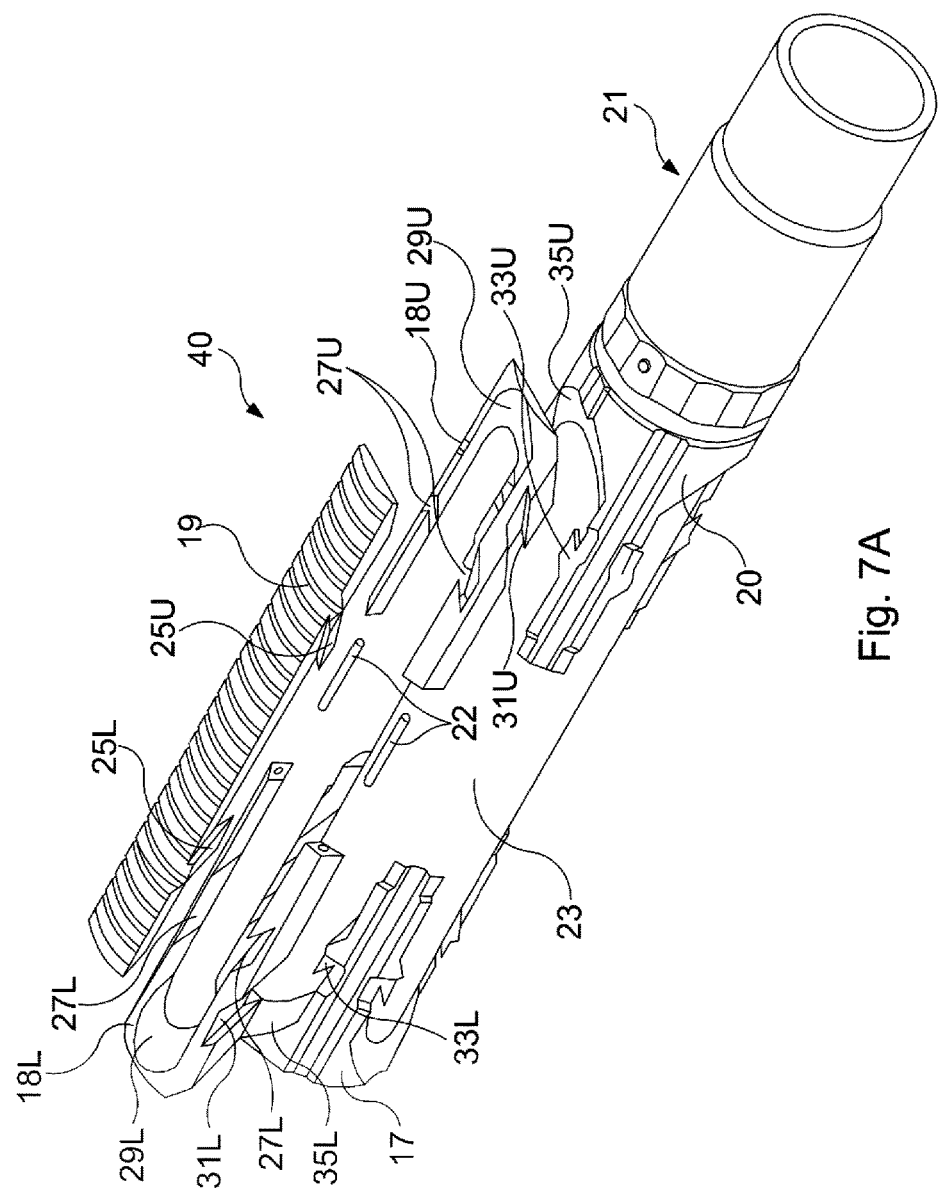
FIG. 7A is an exploded perspective view of the slips mechanism of FIG. 3B.

As can be best seen in FIG. 4, there are three slips 19 equi-spaced 120° apart around the circumference of the cone mandrel 23 and, as best seen in FIG. 3B and FIG. 7A, each slip 19 comprises a pair of outwardly projecting arms 25U, 25L. Each of the arms 25U, 25L are arranged at an angle such that they are angled from radially inner most to radially outer most away from the center of the slip 19. The slips 19 are mounted in a cone 18U, 18L at each end where the arms 25U, 25L sit in respective angled recesses 27U, 27L formed in the cones 18U, 18L The angled recesses 27U, 27L are again angled from radially inner most to radially outer most in a direction away from the center of the two cones 18U, 18L as shown in FIG. 7A. A pair of guide pins 22 telescopically and slidingly connect the pair of cones 18U, 18L to one another and the arms 25U, 25L and angled recesses 27U, 27L are arranged such that any movement of the lower cone 18L toward the upper cone 18U will result in radially outward movement of the slip 19. Furthermore, the respective upper 29U and lower 29L outward facing surface of the respective cones 18U, 18L is tapered at preferably the same angle as the respective angled recess 27U, 27L in order to ease radially outward movement of the slips 19 when the respective upper and lower ends of the slips 19 meet said outward facing surface 29.

In turn, the cones 18U, 18L are each provided with their own angled recesses 31U, 31L in their outer side faces and which are arranged to engage with angled arms 33U, 33L provided on the respective upper 20 and lower 17 cone expanders such that any movement of the lower cone expander 17 toward the upper cone expander 20 will result in longitudinal movement of the cone 18L toward the upper cone 18U. Furthermore, once the lower cone 18L has travelled sufficiently in the longitudinal direction to butt against the upper cone 18U (such that the guide pins 22 are entirely contained within the cones 18U, 18L), the interaction between the angled recesses 31U, 31L and angled arms 33U, 33L will result in radially outward movement of the cones 18U, 18L and will thus result in even further radial outward movement of the slips 19. Thus, a much greater radial outward movement of the slips 19 is possible with the slip section 40 than compared with conventional slip sections and thus a high expansion slip system 40 is provided. Again, as most clearly shown in FIG. 7A, the outward facing surfaces 35U, 35L provided at the ends of the respective cone expanders 20, 17 are also tapered in a direction from radially inner most to radially outer most away from each other and said tapered outward facing surfaces 35U, 35L help promote radially outward movement of the cones 18LJ, 18L when their respective ends meet said surfaces 35U, 35L

It should be noted that whilst the angles of the tapered surfaces 35U, 33U, 31U (and the other respective surfaces for the lower cone 18L) are preferably all the same, they need not be the same as the tapered surfaces 29U, 27U, 25U and in the embodiments shown in FIG. 7 A they are indeed not the same because it is preferred to have a steeper angle of 20° (to the longitudinal axis of the slip section 40) acting between the slip 19 and the cone 18 (compared to a shallower angle of 15° between the cone 18 and the cone expanders 17, 20) in order to promote radial outward movement of the slip 19 first and then have movement in a radial outward direction of the cones 18U upon further longitudinal movement of the cone expander 17 towards the upper cone expander 20. However, it may in some other applications that it would be preferred to move the cones 18 outwards first before then moving the slips 19 with respect to the cones and in such a situation, the angle between the slip 19 and the cone 18 is shallower than the angle between the cone 18 and the cone expanders 17, 20.

Embodiments of the high expansion slip system in accordance with the first aspect of the present invention such as the slip section 40 can be used in any situation where an operator requires to transfer loads into a formation to for instance hang a load off a formation such as hanging off casing or tubing for production, injection or for the purpose of stimulation of the well or for any other application where it is desirable to anchor the tubing/casing. By anchoring the tubing/casing, relative movement and loads are confined to the anchor points.

It should be noted that whilst the slips section 40 is actuated by the setting section 60 and locking section 50 in the preferred embodiment disclosed in the drawings, other embodiments of slips section 40 could be actuated by different types of setting sections for instance by hydraulic, hydrostatic or electrical downhole motors.

B. Setting Section 60

The setting section 60 is a mechanical setting section and comprises a bottom sub 1 securely screw threaded at its upper end to the lower end of a mandrel 3. A sleeve stop 2 is securely screw threaded into the inner surface of the bottom sub 1 and serves to act as a stop to shift sleeve 4 as will subsequently be described.

Figure 5A:
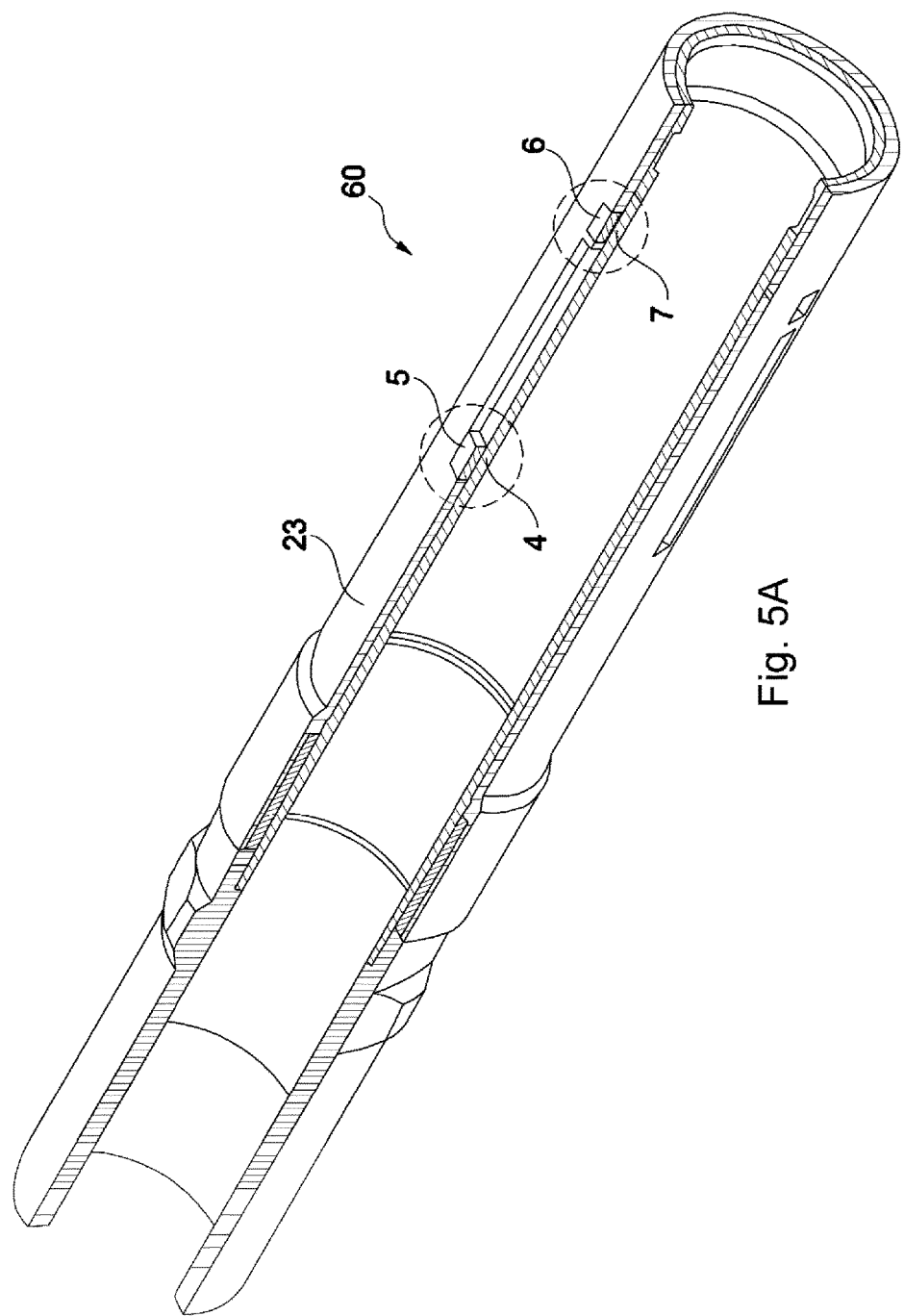
FIG. 5A is a part cross-sectional perspective view of some of the components of the mechanical set slips anchor that form the interlock mechanism in accordance with the second aspect of the present invention.

A shift sleeve 4 is also provided on the interior of the mandrel 3 and were it not for shear screw 8, inner interlock key 7 and setting load key 5, the shift sleeve 4 would be freely moveable in the mandrel 3. However, a shear screw 8 (initially at least) locks the shift sleeve 4 with respect to the cone mandrel 23. However, if a mechanical shifting tool (not shown) is run into the well bore and engages the shifting profile 37 and is pulled with sufficient force in the upward direction (left to right in e.g. FIG. 1E) the shear pin 8 will fail and be sheared. At this point, it is important to note that the inner most surface of the inner interlock key 7 is screw threaded to the outer surface of the shift sleeve 4 and the outer surface of the outer interlock key is screw threaded to the inner surface of a setting sleeve 9. The outer surface of the inner interlock key has at least one and, as shown in FIG. 5D, preferably has three upset ridges which sit upon three inwardly projecting upset ridges provided on the inner most surface of the outer interlock key 6. Consequently, whilst the inner and outer interlock keys 7, 6 are in the configuration shown in FIG. 5D, the inner interlock key 7 is screw threaded to the shift sleeve 4 and more importantly the setting sleeve 9 is screw threaded to the outer interlock key 6. Because the outer interlock key 6 is the same length as the aperture within which it sits, this means that the setting sleeve 9 cannot move. However, once the shear screw 8 has ruptured, longitudinal movement of the inner interlock key 7 can occur with respect to the outer interlock key 6 until the three upset ridges clear one another at which point the inner 7 and outer 6 interlock keys can collapse in on one another thus breaking the respective screw threaded connections with the shift sleeve 4 and the setting sleeve 9.

The setting or load key 5 comprises a number of inwardly projecting ridges 42 which can move back and fore within corresponding outwardly projecting ridges 43 provided on the outer surface of the shifting sleeve 4 and it should be noted that the distance between the outwardly projecting ridges 43 on the shifting sleeve 4 is greater than the distance required for the ridges of the inner 7 and outer 6 interlock keys to clear one another. Accordingly, once the inner 7 and outer 6 interlock keys have collapsed in on one another, any continued upward movement of the shift sleeve 4 will result in the outwardly projecting ridges 43 butting against the inwardly projecting ridges 42 of the load setting key 5 and thus the load setting key 5 will be carried upwards with the shift sleeve 4. It should be noted that the load key 5 is located in a longitudinal slot within the mandrel 3/cone mandrel 23 and thus because the load key 5 is screw threaded to the inner surface of the setting sleeve 9 at the lower end of the setting sleeve 9, any continued upward pulling of the shifting tool (not shown) will result in upward movement of the shift sleeve 4, the load key 5 and the setting sleeve 9.

The setting section 60 when used in conjunction with a mechanical set slips anchor 100 such as the preferred embodiment slip section 40 proves particularly advantageous in horizontal wells because the setting section 60 provides the feature of being able to positively lock the shift sleeve 4 to the rest of the tool 100. In addition to this, the setting section 60 will be able to withstand a high load on the outside of it (as experienced when running the tool 100 in the hole) without activating, whilst a low load will be required to trigger the setting section 60 from the inside of the tool 100 (when the shifting tool shifts the sleeve 4). Accordingly, the setting mechanism in the form of the setting sleeve 9 on the outside of the tool 100 is mechanically locked until the internal shift sleeve 4 is manipulated by the shifting tool. This is particularly advantageous in horizontal wells as the drag on the tool 100 running in the well will not pre-set the tool 100 (which can happen with conventional tools without such a setting section 60).

C. Locking Section 50

Figure 2C:
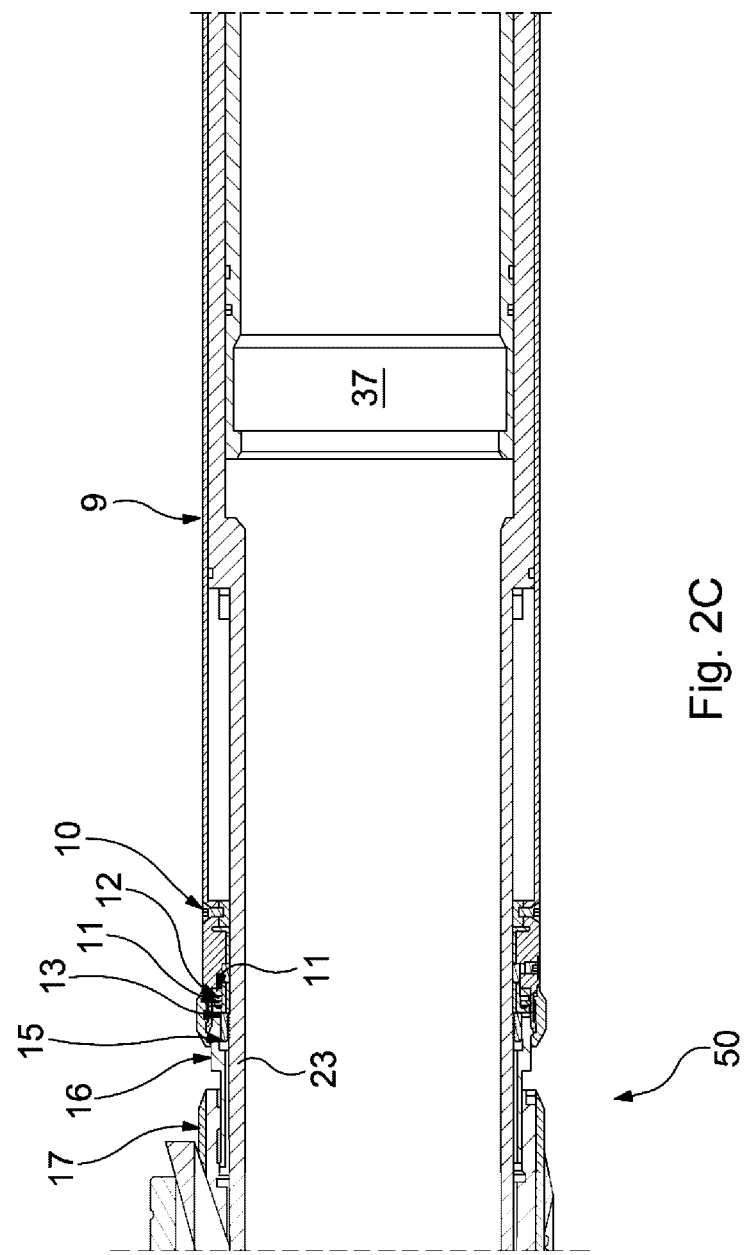
FIG. 2C is a cross-sectional side view of a third portion of the mechanical set slips anchor of FIG. 2A and which in use is located immediately below the portion shown in FIG. 2B and immediately above the portion shown FIG. 2D, and more particularly shows an embodiment of a lock ring in accordance with the third aspect of the present invention.
Figure 2D:
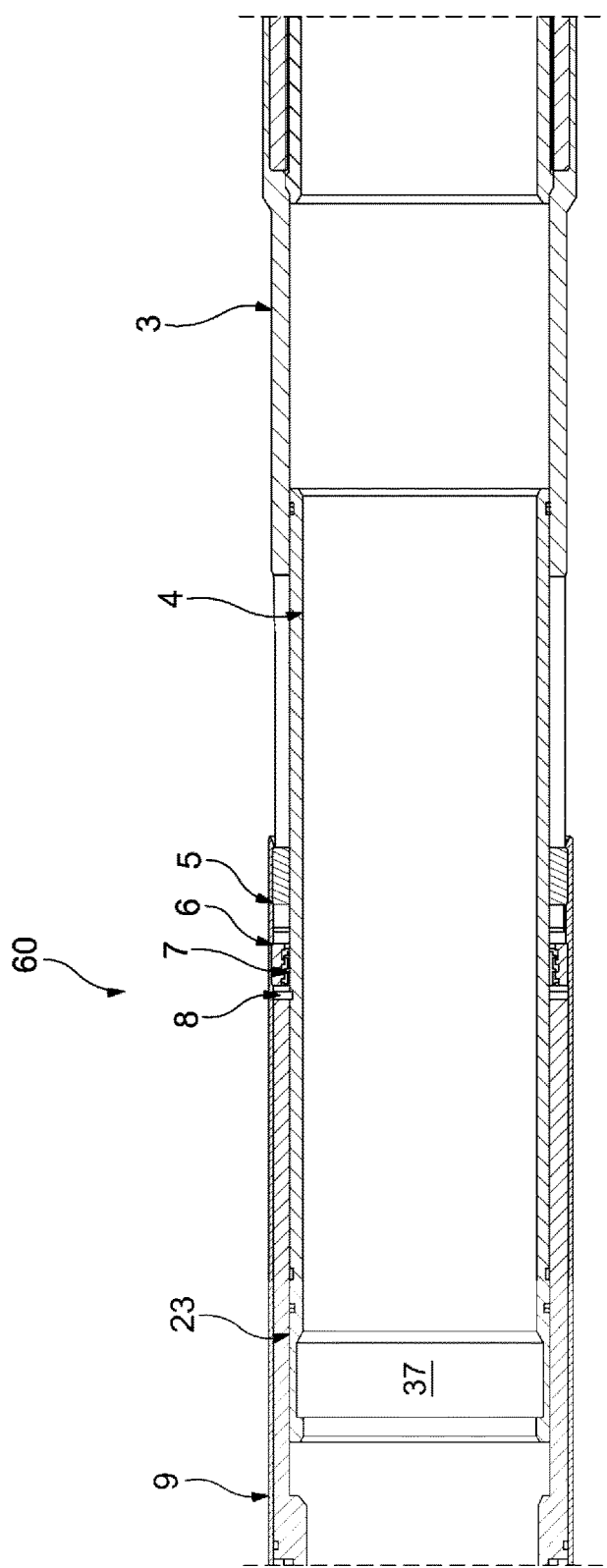
FIG. 2D is a cross-sectional side view of a fourth portion of the mechanical set slips anchor of FIG. 2A and which in use is located immediately below the portion shown in FIG. 2C and immediately above the portion shown in FIG. 2E, and more particularly shows an embodiment of an interlock mechanism in accordance with the second aspect of the present invention.
Figure 2E:
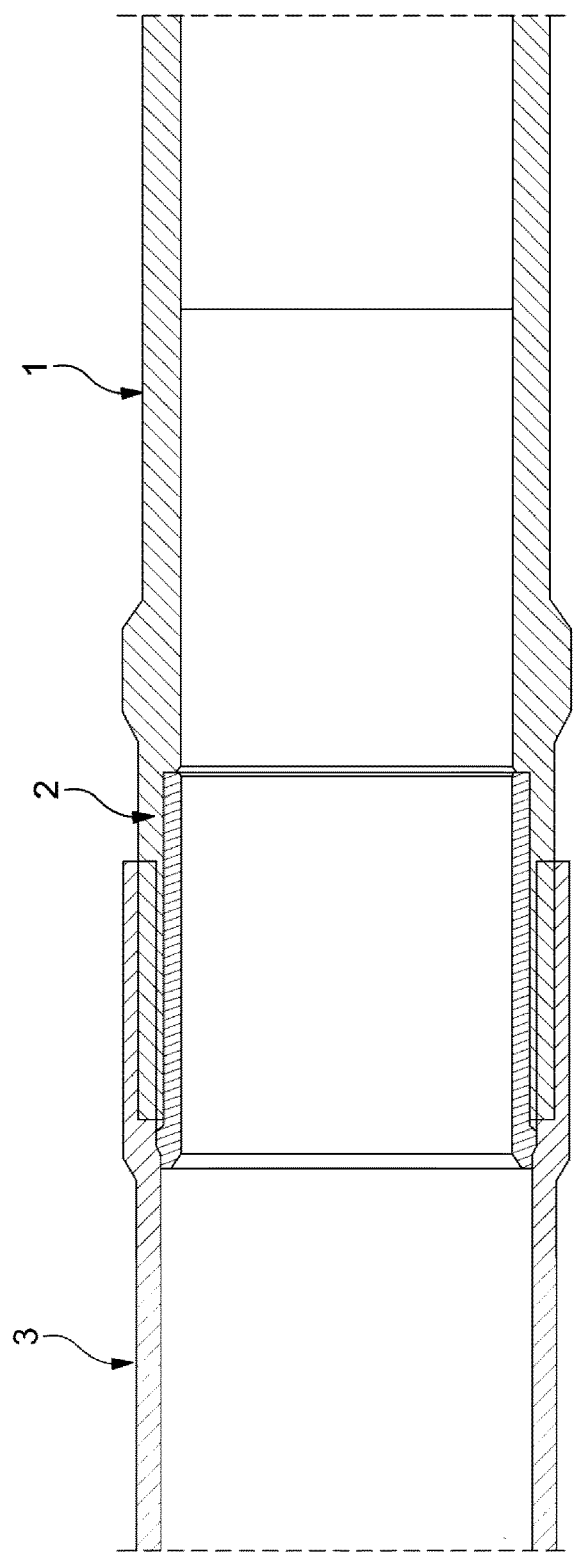
FIG. 2E is a cross-sectional side view of a fifth portion of the mechanical set slips anchor of FIG. 2A and which in use is located immediately below the portion shown in FIG. 2D, and which forms the lower most portion in use of the mechanical set slips anchor.
Figure 6A:
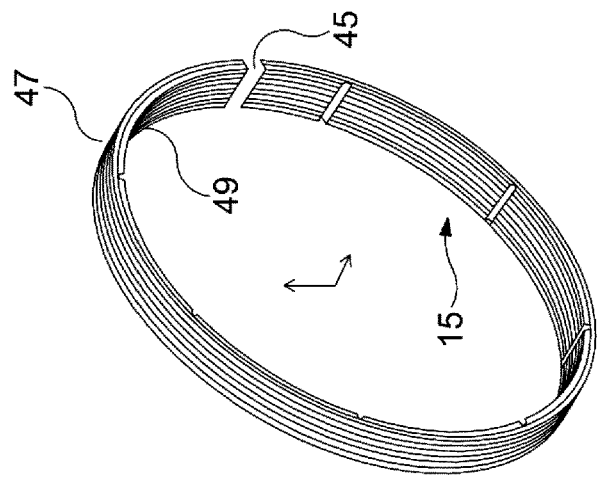
FIG. 6A is a perspective side view of the reduced backlash lock ring of FIG. 1D and FIG. 1DA.
Figure 6C:
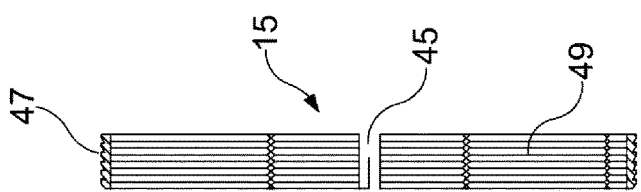
FIG. 6C is a cross-sectional side view across section AA of FIG. 6B of the reduced backlash lock ring.
Figure 6B:
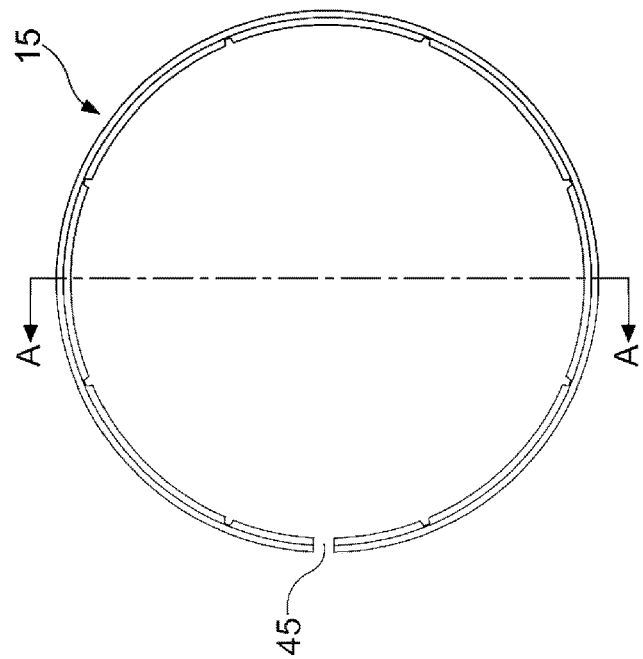
FIG. 6B is an end view of the reduced backlash lock ring of FIG. 6A.
Figures 6D, 6E:
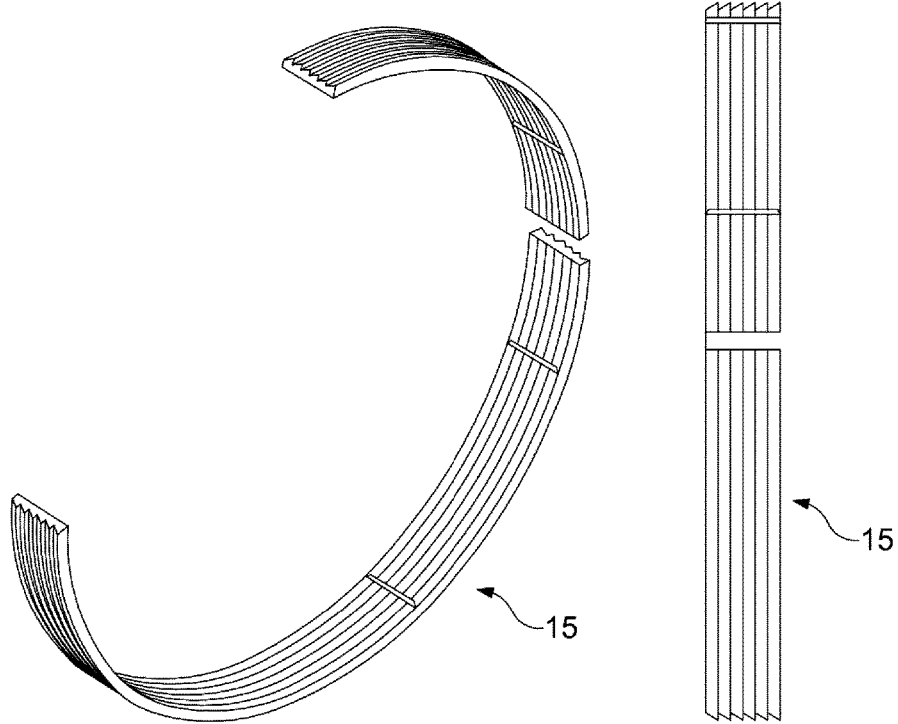
FIG. 6D is a perspective side view of the reduced backlash lock ring of FIG. 6A with a quarter circle of a portion of the lock ring removed for clarity and comparison purposes.
FIG. 6E is a side view of the lock ring of FIG. 6D with the quarter circle portion removed to aid comparison purposes between the outer and inner ratchet mechanisms.

The locking section 50 is best shown in FIG. 1C which shows the running in and pre-actuation configuration and in FIG. 2C which shows the post actuation or set configuration. The locking section 50 comprises a C-shaped reduced backlash lock ring 15 in accordance with the third aspect of the present invention and as best seen in FIGS. 6A-6E. As shown in FIG. 6A, the lock ring 15 is near circular but comprises a notch 45 provided therein at a point around its circumference such that the lock ring 15 covers in the region of 350-359°. Accordingly, the lock ring 15 can be compressed slightly to reduce its diameter if required. As can also be seen in FIG. 6A, the lock ring 15 comprises a right angled saw tooth 47 on its outer circumference having a pitch in the region of 8 TPI (0.125" pitch) and further comprises a much finer right angled saw tooth 49 formed on its inner circumference which is in the region of 16-32 TPI (0.031" to 0.062" pitch).

The lock ring 15 is placed around the relatively smooth outer circumference of the cone mandrel 23 such that its outer right angled saw toothed thread profile 47 engages with an inwardly projecting and corresponding right angled saw tooth thread profile provided on an inner circumference of the lower end of an adjustor sub 16 which is fixedly screw threaded to the lower end of the lower cone expander 17. A load ring 13 is butted up against the lower end of the reduced back lash lock ring 15 by means of a wave spring 11 and spring washer 12 arrangement that acts to bias the load ring 13 against the lock ring 15 and in practice tries to push the lock ring 15 upwards (from right to left in FIG. 1C) with respect to the adjustor sub 16.

Figure 1D:
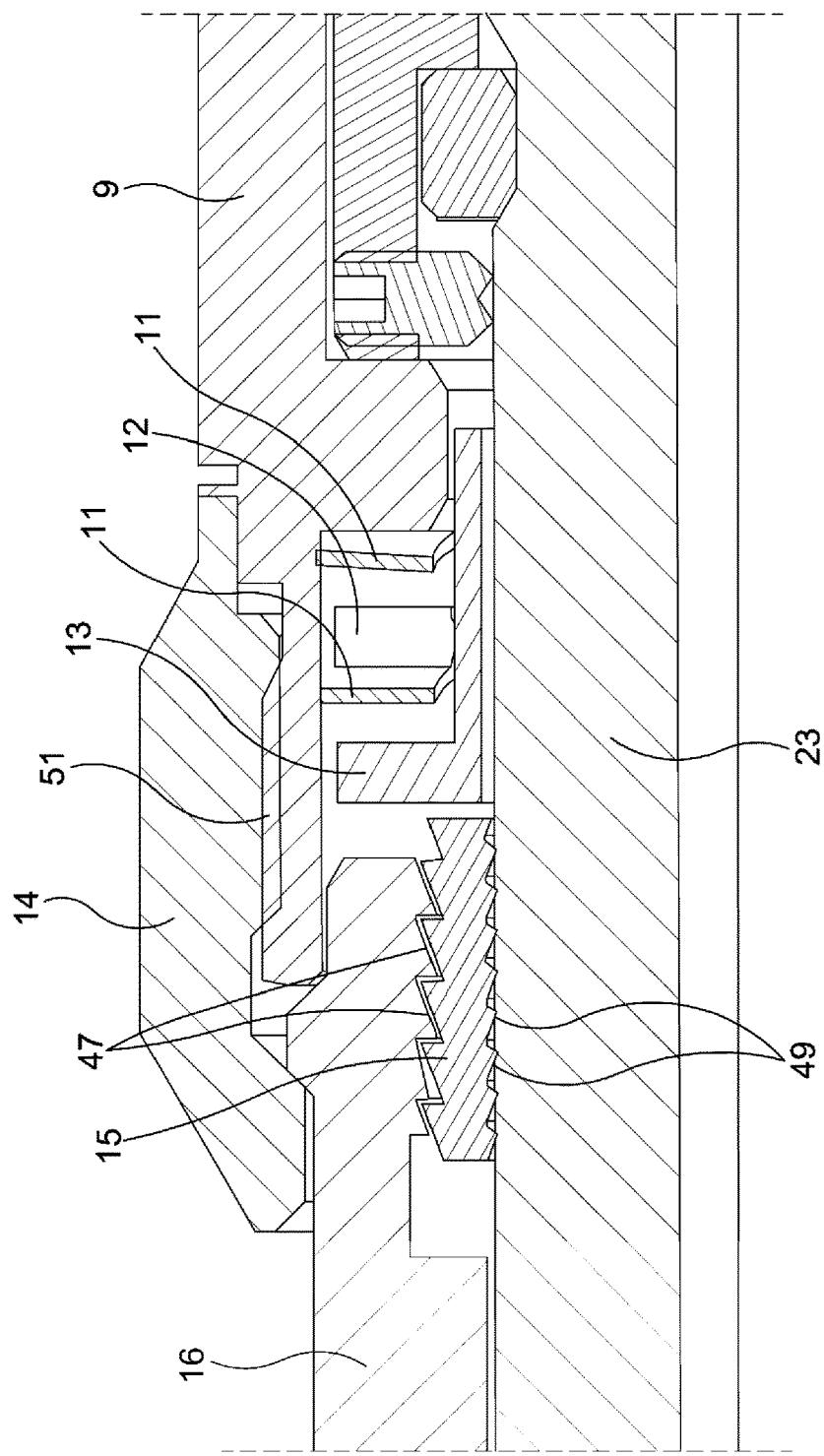
FIG. 1D is a close up and more detailed cross-sectional view of one part of the third portion of the mechanical sets slips anchor of FIG. 1C, where the part shown in FIG. 1D is an embodiment of a reduced back lash lock ring in accordance with the third aspect of the present invention.
Figure 1D:
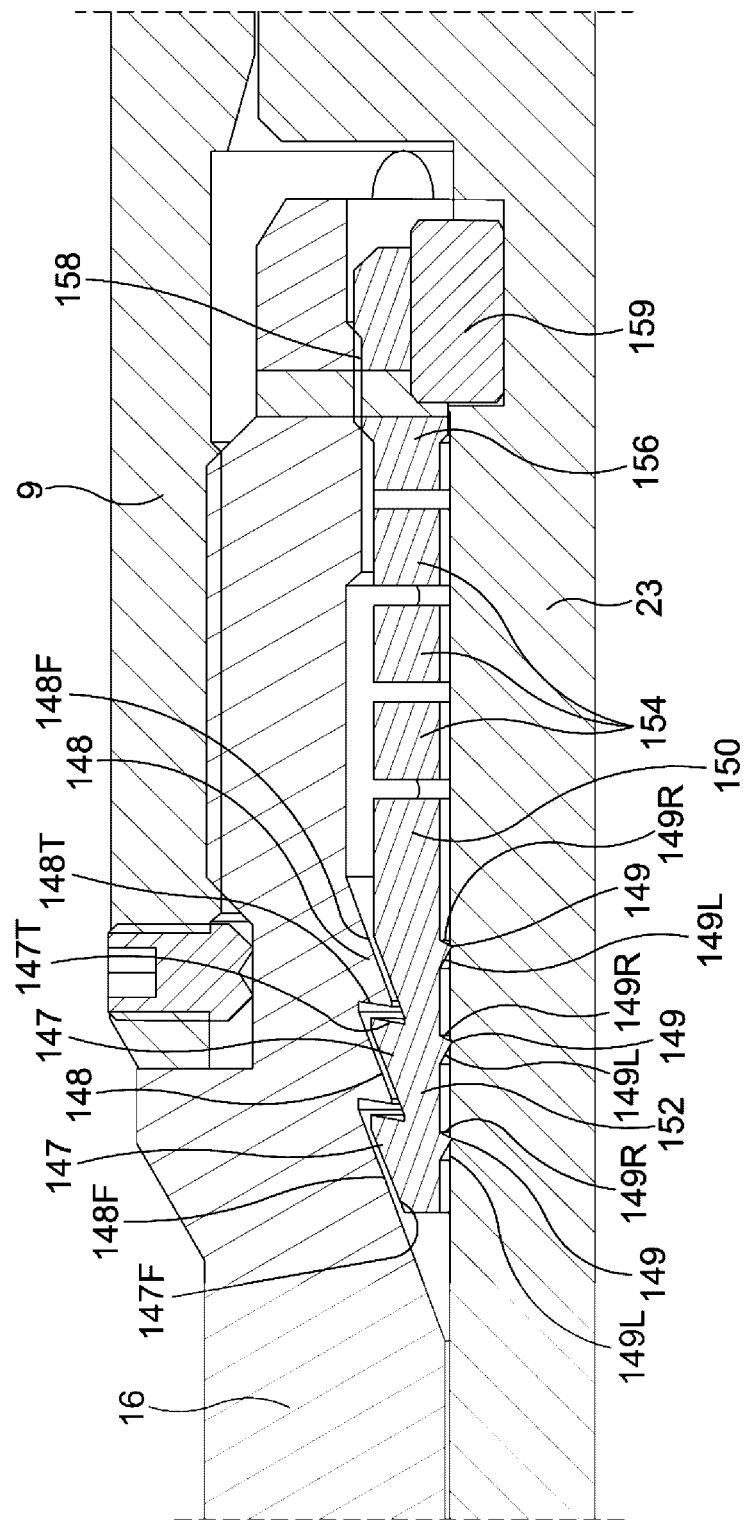
Figure 1H:
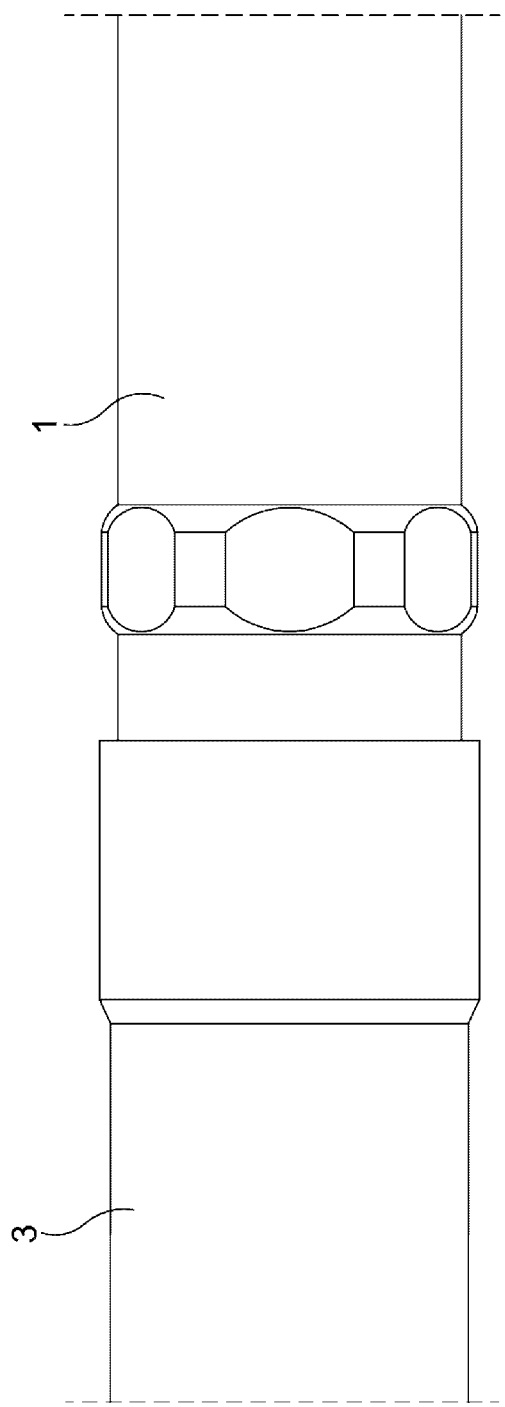
FIG. 1H is a part cross-sectional side view of a fifth portion of the mechanical set slips anchor of FIG. 1A and which in use is located immediately below the portion shown in FIG. 1E and forms the lower most portion of the mechanical set slips anchor in use.

A connector 14 is placed around the outer circumference of the lower end of the adjustor sub 16 and is threaded onto the upper end of the setting sleeve 9 by means of co-operating screw threads 51 as best seen in FIG. 1D. By adjusting this thread the adjuster sub 16 is driven into the lock ring 15 in order to pre-load the lock ring 15 which in turn compresses the wave springs 11. This is to ensure that there is a constant spring load exerted onto the flank angles of the pitch profile on the outside edge of the lock ring 15 and the inside profile of the adjuster sub 16.

As shown in FIG. 1D, a flat head screw 10 projects radially inwardly from the setting sleeve 9 and projects into a longitudinally arranged slot 24 formed in the cone mandrel 23 such that whilst the flat head screw 10 is located in the longitudinally arranged slot 24, the setting sleeve 9 is prevented from rotating with respect to the cone mandrel 23. As previously described, the shifting tool (not shown) is used to pull the setting sleeve 9 upwards with great force and this acts upon the load ring 13 via the wave spring 11 to move the lock ring 15 up the outer surface of the cone mandrel 23.

With conventional lock rings, typically a right angled saw tooth ratchet mechanism would be formed on the outer surface of the cone mandrel 23 to interact with the inner surface of the lock ring such that the lock ring "climbs" up the ratchet mechanism provided on the cone mandrel 23.

However, the lock ring 15 of the present invention provides the great advantage that it does not require a ratchet mechanism to be formed on the outer circumference of the cone mandrel 23. In fact, the outer surface of the cone mandrel 23 can be simply lightly roughened (for instance with some scratches provided on its outer surface) or even just left smooth because the lock ring 15 of the preferred embodiment is formed from a very hard material such as nitrided steel such as 50 Rockwell C compared to a softer steel such as for instance 20 Rockwell C steel for the cone mandrel 23 and because the inner circumference of the lock ring 15 has a much finer right angled saw tooth ratchet mechanism compared to conventional lock rings, the inner circumference of the lock ring 15 will bite or dig into the outer circumference of the cone mandrel 23 as it is moved up the cone mandrel 23. Alternatively or in addition, the material of the lock ring 15 may be surface treated to provide the teeth 49 with at least an outer surface formed from a harder material than the material of the cone mandrel 23.

The right angled saw tooth form of the outer circumference of the lock ring 15 is a tapered thread form which spreads the load across the length of the lock ring 15 in use. The flank angle of the outer right angle saw tooth thread form on the lock ring 15 is typically in the region of 20 degrees which is shallow enough so that when a given axial load is exerted on it, it reduces the required amount of inward radial load to initiate the hardened (much finer) saw tooth profile on the inside of the lock ring 15 to bite onto the mandrel 23.

It is this ability to exert a constant load onto the flank angle that provides great advantages to embodiments of the present invention and therefore the only backlash exerted by the lock ring 15 is the backlash that is induced when the hardened inner teeth "bite" into the mandrel 23.

FIGS. 8A-8E show a preferred embodiment of a reduced backlash lock ring 150 in accordance with the third aspect of the present invention and FIG. 1DB shows the lock ring 150 located in situ within the tool 100. The lock ring 150 of FIGS. 8A-8E is preferred to the lock ring 50 of FIGS. 6A-6E for a number of reasons.

The lock ring 150 has three main sections:
 i) lock ring section 152 comprising at least one saw tooth 147 thread profile formed on its outer circumference—as shown in the Figs., there are two such teeth 147. The lock ring section 152 also comprises a much more shallow and finer at least one right angled saw tooth 149 formed around its inner circumference (there are three such right angled saw teeth 149 shown on the embodiment of FIGS. 8A-8E). The lock ring section 152 comprises a number of castellated tongues 151 equi-spaced around its circumference as will be described subsequently;
 ii) spring section 154 comprising a repeating S-shaped spring and which in use will perform the same function as the load ring 13 and wave springs 11 of the less preferred load ring 15; and
 iii) screw threaded section 156 which comprises a complete circular annular ring 157 and which on the outer surface thereof is formed a screw thread 158 to enable the lock ring 150 to be screw threaded to (and thereby secured directly to) the lower end of the adjustor sub 16.

The lock ring 150 is located around the relatively smooth outer circumference of the cone mandrel 23 such that its outer saw tooth thread profile 147 engages with an inwardly projecting and corresponding saw tooth thread profile 148 provided on the inner circumference of the lower end of the adjustor sub 16 (which again is fixedly screw threaded to the lower end of the lower cone expander 17). Depending upon the extent that the lock ring 150 is screwed into the lower end of the adjustor sub 16 via the threads 158, will determine how much pre-loading is included into the spring section 154 in order to bias and thereby push the lock ring section 152 upwards (from right to left in FIG. 1DB with respect to the rest of the adjustor sub 16). This again ensures that there is constant contact between the flank angles 148F and 147F during operation or actuation of the lock ring 150 and moreover ensures a constant spring load exerted onto the flank angles 147F of the pitch profile 147 on the outer circumference of the lock ring 150 and the flank angles 148F provided on the inside profile 148 of the adjustor sub 16.

Again, the outer surface of the cone mandrel 23 can be simply lightly roughened (for instance with some scratches provided on its outer surface) or even just left smooth because the lock ring 150 of the preferred embodiment is formed from a very hard material, typically nitrided steel having a hardness of 50 Rockwell C or greater (compared to the softer steel of the cone mandrel 23 which may be in the region of 18 to 22 Rockwell C hardness). Again, alternatively or in addition, the material of the lock ring 150 may be surface treated to provide the teeth 149 with at least an outer surface formed from a harder material than the material of the cone mandrel 23.

In any event there is preferably a difference of at least 20 Rockwell C between the hardness of the teeth 149 and the hardness of the cone mandrel 23.

Furthermore, the teeth 149 have a lead face 149L which is relatively shallow (the lead face 149L typically has an angle in the region of 30 degrees radially outwardly in the direction from left to right of FIG. 1DB of the longitudinal axis of the lock ring) which will tend to lift the teeth 149 radially outwardly when the lock ring section 152 moves up the cone mandrel 23 during actuation.

In addition, the mating faces of the thread profiles 148T, 147T are preferably arranged at 80° (radially outwardly in the direction from left to right of FIG. 1DB of the longitudinal axis of the lock ring 150) in order to provide a back angle to the thread profiles 148T, 147T and this provides an advantage during assembly of the lock ring 150 onto the cone mandrel 23. During assembly, the lock ring 150 is initially screwed relatively far into the lower end of the adjustor sub 16 via the threads 158 such that the flank faces 147F and 148F are compressed together due to compression in the spring section 154. The end of the lock ring 150 beside the screw threads 158 is then rotated in the reverse direction such that the compression in the spring section 154 is removed and instead tension is induced in the spring section 154. This causes the flank angles 147F, 148F to move apart and, instead, the back angles 148T, 147T will come into contact with one another. This causes the lock ring section 152 to open up or be moved radially outwardly such that the teeth 149 are clear of the cone mandrel 23. Accordingly, the presence of the back angles 148T, 147T and the contact therebetween enables the setting sleeve 9 and adjuster sub 16 with the lock ring 150 to then be slid down the cone mandrel 23 during the next stage of assembly of the tool 100 (such downward movement (from left to right in FIG. 1DB) normally being prevented during the actuation stage of operation) until the inner circumference of the threaded end 158 of the lock ring 150 sits over a key 159 which prevents rotation of the lock ring 150 with respect to the cone mandrel 23. The final step of the assembly of the lock ring section 150 is completed by rotating the setting sleeve 9 and the adjuster sub 16 with respect to the cone mandrel 23 and hence the lock ring 150 such that the setting sleeve 9 and the adjuster sub 16 move downwards (from left to right in FIG. 1DB) with respect to the stationary cone mandrel 23 to remove the tension in the spring section 154 such that the connection between the back angles 148T and 147T is removed (this is the exact configuration shown in FIG. 1DB)

and further until compression is induced in the spring section 154 such that the connection between the flank angles 148F and 147F is provided. The lock ring section 150 is thus ready for actuation. Accordingly, the back angles and their contact during the assembly of the tool 100 aid free movement of the lock ring section 152 in the assembly of the tool 100 but play no part in the operation of the lock ring 150 during actuation thereof and thus the lock ring 150 only allows movement in one direction (i.e. from right to left in FIG. 1DB) and prevents movement of the setting sleeve 9 in the downwards or reverse direction (from left to right in FIG. 1DB) during the actuation stage of the tool 100. In other words, it should be noted that the possibility of free movement for the lock ring 150 as shown for example in FIG. 2DB from left to right is for assembly purposes only and that, when the anchor 100 is installed and the spring section 154 is compressed, movement of the setting sleeve 9 and adjustor sub 16 from left to right when compared to the stationary cone mandrel 23 will be stopped by the anchor 100, while movement from right to left of the setting sleeve 9 and adjustor sub 16 when compared to the stationary cone mandrel 23 is allowed.

Furthermore, the inner teeth 149 will tend to bite into or dig into the outer circumference of the cone mandrel 23 whenever the lock ring section 152 stops moving up the cone mandrel 23. Furthermore, when the load being exerted by the setting sleeve 9 reduces or is removed, the adjustor sub 16 will be prevented from moving downwards (with respect to the cone mandrel 23/string of tubulars or upwards as shown in FIG. 1DB when viewing it in portrait or from left to right when viewing FIG. 1DB in landscape and any attempted movement of the adjustor sub 16 downwards with respect to the cone mandrel 23 means that the flank angles 148F of the thread profiles 148 will force the flank angles 147F of the thread profile 147 radially inwardly thereby digging the inner teeth 149 even further into the cone mandrel 23 and further preventing such downwards movement of the adjustor sub 16 with respect to the cone mandrel 23.

Preferably, the flank angles 147F, 148F are in the region of 20° to the longitudinal axis of the tool 100 and this provides the advantage that this relatively shallow angle requires less force to push the teeth 149 into the cone mandrel 23 than an otherwise greater angle would require.

As can be seen in FIG. 8A, the lock ring section 152 and spring section 154 are slotted or castellated in order to allow the individual tongues 151 (as shown in FIG. 8A there are six in the embodiment of lock ring 150) to move radially inwardly as required in order to bite into the cone mandrel 23. Furthermore, it should be noted that the inner diameter of the lock ring section 152 and spring section 154 is ever so slightly smaller than the outer diameter of the cone mandrel 23 (although the inner diameter of the threaded section 156 is a close fit with or is just slightly larger than the outer diameter of the cone mandrel 23) and this provides the advantage that the outer edges of the teeth 149 on each tongue 151 will tend to bite into the cone mandrel 23 first and then the rest of the teeth 149 (i.e. in between the outer edges of each tongue 151) will then bite into the cone mandrel 23 and this provides a better engagement between the teeth 149 and the cone mandrel 23.

Consequently, embodiments of the third aspect of the present invention provide the advantage that they provide much reduced back-off or back lash compared to conventional lock rings when the actuation force is removed and thus greater force can be maintained with the tool to which the locking section 50 is attached which in this case is a slip section 40 but could be for instance a packer mechanism or the like.

Accordingly, embodiments of the third aspect of the present invention have the advantage that, because the lock ring 15, 150 is preloaded with the spring 11, 154, this eliminates the back lash that would conventionally be experienced on the outer thread profile. Furthermore, because there is no inner ratchet mechanism for the inner teeth 49, 149 to jump, the back lash that would conventionally be experienced with conventional lock rings has been eliminated. It is believed that embodiments of the reduced back lash ring in accordance with the third aspect of the present invention will prove very beneficial to a wide variety of applications (downhole oil & gas related and non-downhole) where a reduced backlash one way movement mechanism is required. Potential downhole oil and gas applications include setting of metal to metal seals (since these require relatively high setting forces and conventional lock rings with reasonably high backlash can be unreliable when setting them because the setting forces may be achieved but can then be lost when the backlash occurs), packers, bridge saddles, slips (such as the example given herein) liner hangers and others.

Modifications and improvements may be made to the embodiments hereinbefore described without departing from the scope of the invention.

For instance, the setting sleeve could be modified to allow a releasing shearing feature once a set load has been applied and this will allow the shift sleeve 4 to stroke fully and release the shifting tool (not shown). In this modification, an interlock may be required to transfer initial setting forces through a path other than the releasing shear screws to avoid initial shearing of the screws as the initiation screws fail in the shift sleeve 4. This feature would disengage once a small amount of travel has been made by the setting sleeve 4.

What is claimed is:

1. An expandable slips system for use on a mandrel having a longitudinal axis, the mandrel adapted to be run into a borehole, the expandable slips system comprising:
    at least one slip which in use is adapted to be moved outwardly from the longitudinal axis of the mandrel to grip against and thereby engage a downhole formation, the at least one slip comprising at least two angled members;
    at least two cone members for engagement with the at least one slip, each cone member comprising at least one angled member for engagement with a respective one of the at least two angled members of the slip; and
    at least two cone member expansion devices, each cone member expansion device of the at least two cone member expansion devices being for engagement with at least one of the at least two cone members, each cone member expansion device comprising at least one angled member for engagement with a respective at least one further angled member of each cone member,
    wherein the at least two cone member expansion devices are spaced apart along the longitudinal axis of the mandrel,
    wherein one of the at least cone member expansion device is fixed to the mandrel and the other of the at least cone member expansion devices is moveable along the longitudinal axis of the mandrel with respect to the one cone member expansion device such that the moveable cone member expansion device can be selectively moved toward and away from the one fixed cone member expansion device, wherein the at least two cone members are spaced apart along the longitudinal axis of the mandrel, wherein each end of the slip is mounted in one of the at least two cone members, and wherein one of the at least two cone members is engaged with the fixed cone member expansion device and the other of the at least two cone members is engaged with the moveable cone member expansion device such that the one cone member can be selectively moved toward and away from the other cone member when the moveable cone member expansion device is selectively moved toward and away from the one fixed cone member expansion device to respectively move the slip radially outwardly and inwardly with respect to the mandrel.

2. The expandable slips system of claim 1, wherein the slip system is arranged such that movement of the moveable cone member expansion device towards the fixed cone member expansion device in a direction parallel to the longitudinal axis of the mandrel causes the two cone members to move:

in a direction parallel to the longitudinal axis of the mandrel; and in a radially outwards direction perpendicular to the longitudinal axis of the mandrel.

3. The expandable slips system of claim 1, wherein the pair of the at least two cone members are telescopingly coupled to one another such that they are prevented from relative movement with respect to one another other than longitudinal movement.

4. The expandable slips system of claim 1, wherein a longitudinal force acting on the moveable cone member expansion device toward the one fixed cone member expansion device causes a longitudinal force to act on one cone member toward the other cone member and also a radially outward force to act on both cone members which in turn causes a radially outward force to act on the slip for movement of the slip from a running-in, lying-flat configuration to an extended, in-use configuration.

5. The expandable slips system of claim 1, wherein a longitudinal force acting on the moveable cone member expansion device away from the said one fixed cone member expansion device causes a longitudinal force to act on one cone member away from the other cone member and also a radially inward force to act on both cone members which in turn causes a radially inward force to act on the slip for movement of the slip back to the running-in, lying-flat configuration from the radially extended, in-use configuration.

6. The expandable slips system of claim 1, wherein one or more expandable slips systems are provided on one mandrel.

7. The expandable slips system of claim 6, wherein three expandable slips systems are provided on one mandrel, wherein the three expandable slips systems are provided equi-spaced around the circumference of the mandrel.

8. The expandable slips system of claim 1, wherein the angled member of the slip comprises a surface provided at a first acute angle from the longitudinal axis of the mandrel, and wherein the angled member of the respective cone member also comprises a correspondingly angled surface that engages with and co-operates with the angled surface of the angled member of the slip.

9. The expandable slips system of claim 8, wherein the further angled member of the cone member comprises a surface provided at a second acute angle from the longitudinal axis of the mandrel, and wherein the angled member of the respective cone member expansion device also comprises a correspondingly angled surface that engages with and co-operates with the angled surface of the further angled member of the cone member.

10. The expandable slips system of claim 9, wherein the first and second angles are selected so that the slip moves radially before the respective cone member.

11. The expandable slips system of claim 9, wherein the first and second angles are selected so that the respective cone member moves radially before the slip.

12. The expandable slips system of claim 9, wherein the first angle is greater than the second angle.

13. The expandable slips system of claim 9, wherein the first angle is approximately 20° and the second angle is approximately 15°.

14. The expandable slips system of claim 9, wherein the first angle is less than the second angle.

15. The expandable slips system of claim 1, wherein the angled member or angled surface comprises either an angled key or an angled slot within which the key moveably resides and is retained.

16. The expandable slips system of claim 1, wherein the mandrel is adapted to be included in a string of downhole tubulars and has suitable connections to enable such inclusion.

17. A method of actuating an expandable slips system in accordance with the apparatus of claim 1, comprising:

moving the moveable cone member expansion device towards the fixed cone member expansion device in a direction parallel with the longitudinal axis of the mandrel such that the at least two cone members are moved radially outwardly and the slip is moved radially outwardly from a running-in, lying-flat configuration to an extended, in-use configuration.

* * * * *